United States Patent
Kishimoto et al.

(10) Patent No.: US 8,212,398 B2
(45) Date of Patent: Jul. 3, 2012

(54) POWER SUPPLY DEVICE AND ELECTRIC VEHICLE INCORPORATING SAID DEVICE

(75) Inventors: Keiji Kishimoto, Osaka (JP); Hiroshi Abe, Osaka (JP); Tomoaki Uenishi, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 299 days.

(21) Appl. No.: 12/565,857

(22) Filed: Sep. 24, 2009

(65) Prior Publication Data

US 2010/0079002 A1    Apr. 1, 2010

(30) Foreign Application Priority Data

Sep. 29, 2008    (JP) .................................. 2008-251939

(51) Int. Cl.
*H02J 1/10* (2006.01)
(52) U.S. Cl. ......................................................... 307/43
(58) Field of Classification Search .................... 307/43; 361/679.48; 323/220, 223, 224
See application file for complete search history.

(56) References Cited

U.S. PATENT DOCUMENTS

| 2004/0134698 A1* | 7/2004 | Yamamoto et al. .......... 180/65.2 |
| 2010/0045103 A1* | 2/2010 | Mitsutani ........................ 307/9.1 |

FOREIGN PATENT DOCUMENTS

| JP | 2001185228 | * | 7/2001 |
| JP | 2008118790 | | 5/2008 |
| WO | WO 2008081722 | * | 7/2008 |

* cited by examiner

*Primary Examiner* — Rexford N Barnie
*Assistant Examiner* — Toan Vu
(74) *Attorney, Agent, or Firm* — NDQ&M Watchstone LLP

(57) ABSTRACT

A power supply device 100 comprises a plurality of power storage devices 10 connected in parallel, and includes an NTC 40 that detects a temperature of each of the plurality of power storage devices 10, an FET 21/22 connected to each of the plurality of power storage devices in series, and a control unit that controls ON and OFF states of the FET 21/22. The control unit performs a temperature control to increase a time ratio of the OFF state in controlling the ON and OFF states of the FET 21/22 based on the temperature detected by the NTC 40. Thus, a power supply device and an electric vehicle that can restrain shortening of the life duration of the device as a whole can be provided by restraining increase and variation of the temperature of each power storage device.

6 Claims, 19 Drawing Sheets

POWER SUPPLY DEVICE AND ELECTRIC VEHICLE INCORPORATING SAID DEVICE

CROSS REFERENCE TO RELATED APPLICATIONS

This application claims priority based on 35 USC 119 from prior Japanese Patent Application No. P2008-251939 filed on Sep. 29, 2008, the entire contents of which are incorporated herein by reference.

BACKGROUND OF THE INVENTION

1. Field of the Invention

The present invention relates to a power supply device having a plurality of power storage devices connected in parallel. The present invention also relates to an electric vehicle that incorporates such power supply device.

2. Description of Related Art

A power supply device having a plurality of power storage devices connected in parallel is generally known. Such a power supply device achieves high capacity and high power by providing the plurality of power storage devices.

For each such power storage device, a current allowed to flow through the power storage device (hereinafter referred to as an "allowable current") is established. If the current that flows through the power storage device exceeds the allowable current due to for example variation or change in the internal resistance of each power storage device, deterioration of the power storage device becomes accelerated.

Thus, technology was proposed in which a current that flows through each power storage device is controlled such that the current that flows through each power storage device does not exceed the allowable current. See e.g. Japanese Patent Laid-Open No. 2008-118790.

More precisely, the power supply device has a current distribution unit connected in series to the power storage device. The current distribution unit controls the current that flows through the power storage device by changing a resistance value of a resistance provided in the current distribution unit.

As described above, deterioration of the power storage device is accelerated when the current that flows through it exceeds the established allowable current due to for example variation or change in the internal resistance of the power storage device.

In addition, if the temperature of each power storage device varies largely due to its positional relationship and a difference in the heat release property of each power storage device, the degree of deterioration varies among the power storage devices. Since the life duration of the entire power supply device is determined by the life duration of the most deteriorated power storage device, if the degree of deterioration in each power storage device varies, the life duration of the power supply device is reduced.

In the above-described technology, while the current that flows through each power storage device is controlled such that it does not exceed the allowable current, variation in the temperature of each power storage device was not considered. In other words, in the above-described technology, shortening of the life duration of the power supply device is still caused by the temperature variation in each power storage device, even though allowable current flow is controlled.

Therefore, an object of the invention is to provide a power supply device and an electric vehicle incorporating the power supply device, which can reduce shortening of the life duration of the device as a whole by restraining the increased temperature and the varied temperature of each power storage device.

SUMMARY OF THE INVENTION

One aspect of the invention is a power supply device having a plurality of power storage devices connected in parallel. The power supply device includes temperature detection units for respectively detecting temperatures of the plurality of power storage devices; switch elements respectively connected in series with the plurality of power storage devices; and a control unit for controlling the ON and OFF states of the switch elements. The control unit performs a temperature control that increases a time ratio of the OFF state to reduce the temperature of the affected power storage device, such that a temperature at the time of canceling the temperature control is lower than a temperature at the time of starting the temperature control in controlling the ratio of ON and OFF states of the switch elements based on the temperatures detected by the temperature detection units. In particular, the control unit performs the temperature control by a first method (1) or a second method (2), which will be described below.

In the method (1) relating to the above-described features, the control unit starts the temperature control when a temperature detected by the temperature detection unit exceeds a start-control temperature. The control unit cancels the temperature control when a temperature detected by the temperature detection unit falls below a cancel-control temperature. The cancel-control temperature is lower than the start-control temperature.

In the method (2) relating to the above-described features, the control unit starts the temperature control when a temperature detected by the temperature detection unit exceeds a control determination temperature. The control unit cancels the temperature control when an elapsed amount of time has reached a control determination time after a temperature detected by the temperature detection unit falls below the control determination temperature.

In the above-described features, the control unit determines that among the plurality of power storage devices, a power storage device for which a repeat count in starting and canceling the temperature control has reached a predetermined value is an abnormal power storage device.

Here, a power storage device that repeats the starting and canceling of the temperature control is a power storage device that is abnormal, and a power storage device use of which needs to be stopped is a defective power storage device, which also is abnormal. A power storage device other than the abnormal power storage device is a normal power storage device.

The control unit may treat the power storage device that is determined as an abnormal power storage device as follows.

(1) The control unit may separate from the power supply device the power storage device determined as an abnormal power storage device by locking its switch element in the OFF state.

(2) When a predetermined amount of time has elapsed after the power storage device is separated from the power supply device, the control unit may rejoin the power storage device determined as an abnormal power storage device by canceling the lock in the OFF state of its switch element.

(3) With a power storage device for which the separation and rejoining are repeated more than a predetermined number of times, the control unit may restrict rejoining the power storage device by maintaining the OFF state of its switch element even when the predetermined amount of time has elapsed after the power storage device is separated.

(4) For a power storage device determined as an abnormal power storage device, the control unit may change a condition in the temperature control (temperature control condition) to a more strict condition than for a power storage device that is not determined as the abnormal power storage device. For example, the control unit may change the temperature control condition as described in (4-1) to (4-3) below.

(4-1) For a power storage device determined as the abnormal power storage device, the control unit may increase a time ratio of the OFF state of the switch element in the temperature control than for a power storage device that is not determined as the abnormal power storage device.

(4-2) For a power storage device determined as the abnormal power storage device, the control unit may decrease the start-control temperature and the cancel-control temperature than for a power storage device that is not determined as the abnormal power storage device.

(4-3) For a power storage device determined as the abnormal power storage device, the control unit may decrease the control determination temperature than for a power storage device that is not determined as the abnormal power storage device. In addition, the control unit may extend the control determination time for the power storage device determined as the abnormal power storage device than for a power storage device that is not determined as the abnormal power storage device.

In the above-described features, the control unit determines that a power storage device for which the temperature control is not cancelled after a predetermined time has elapsed from the start of the temperature control is the abnormal power storage device.

Here, the control unit may treat a power storage device determined as the abnormal power storage device as follows.

(1) The control unit may separate the power storage device determined as the abnormal power storage device by locking its switch element in the OFF state.

(2) The control unit may rejoin the power storage device determined as the abnormal power storage device by canceling the lock in the OFF state of its switch element when a predetermined amount of time has elapsed after the power storage device is separated.

In the above-described features, at least one of the plurality of power storage devices may be composed of a plurality of power storage devices connected in series.

Another aspect of the invention is an electric vehicle, which includes the above-described power supply device, an electric motor that generates power from electric power supplied by the power supply device, and a drive wheel to which the power generated by the electric motor is transmitted.

DETAILED DESCRIPTION OF THE INVENTION

Figure 1:
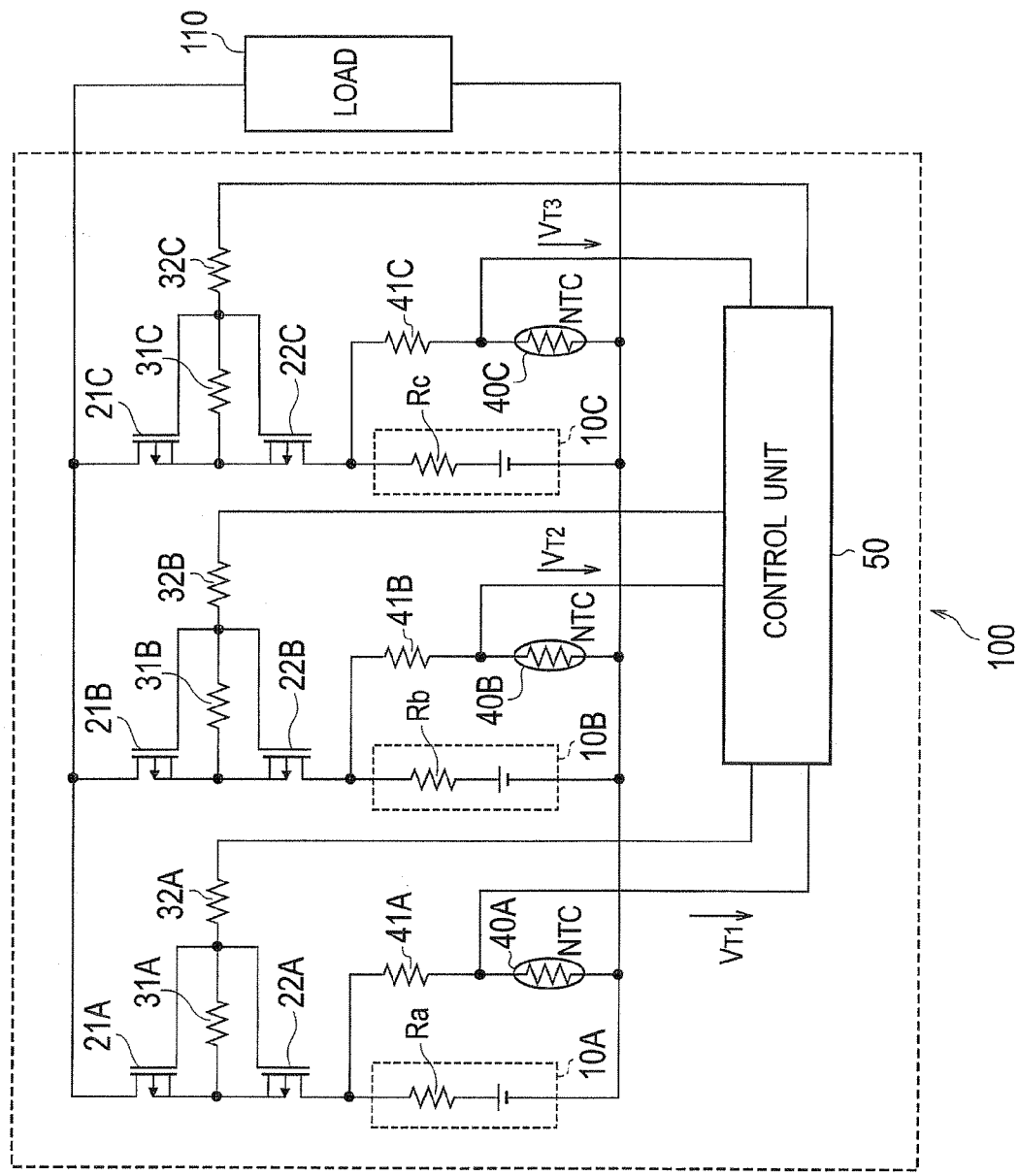
FIG. 1 is a circuit diagram of a power supply device 100 according to the first embodiment of the present invention.

Specific embodiments of the power supply device according to the present invention will be described hereinafter by referring to the drawings. In each of the drawings to be referred to, the same or similar reference numbers are assigned to the same or similar parts.

However, the drawings are provided for explanation only and it should be noted that details such as the ratios of each dimension may differ from reality. Therefore, specific dimensions etc. should be determined by referring to the description below. It also should be noted that there may be parts the dimensional relationships and ratios of which may differ among the drawings.

[General Outline of the Embodiments]

The embodiments of the invention now will be described below. A power supply device includes a plurality of power storage devices connected in parallel. The power supply device includes temperature detection units for detecting temperatures of the plurality of power storage devices respectively; switch elements respectively connected to the plurality of power storage devices in series; and a control unit for controlling ON and OFF states of the switch elements. The control unit performs a temperature control that increases a time ratio of the OFF state in controlling the ON and OFF states of the switch elements based on the temperatures detected by the temperature detection units.

For example, in a temperature control in which the state of the switch element is made in the OFF state when the temperature detected by the temperature detection unit is higher than a predetermined temperature, the control unit increases the time ratio of the OFF state of the switch element. In other words, the control unit lengthens an amount of time for the OFF state. Also, for example the control unit increases the time ratio of the OFF state of the switch element in a temperature control in which PWM signals are outputted to the switch element based on a temperature detected by the temperature detection unit, and the state of the switch element is made in the ON or OFF state according to a high or low state of the PWM signals. In other words, the duty ratio (the ratio of the ON state within a unit time) of the PWM signals is reduced.

Conditions to start and cancel the temperature control are for example conditions (1) or conditions (2) as described below.

(Conditions 1)

The condition to start the temperature control is that the temperature detected by the temperature detection unit exceeds a start-control temperature Ts. The condition to cancel the temperature control is that the temperature detected by the temperature detection unit falls below a cancel-control temperature Te. Here, the cancel-control temperature Te is lower than the start-control temperature Ts and hystereses are provided.

(Conditions 2)

The condition to start the temperature control is that the temperature detected by the temperature detection unit exceeds a control determination temperature Tj. The condition to cancel the temperature control is that an amount of time elapsed after the temperature detected by the temperature detection unit falls below the control determination temperature Tj has reached a control determination time Td.

As such, in these embodiments, the control unit increases the time ratio of the OFF state in the control of the ON and OFF states of the switch element based on the temperature detected by the temperature detection unit. This enables restraining a temperature increase and temperature variation among each power storage device, thus reducing shortening of the life duration of the power supply device as a whole.

In addition, as shown in the above conditions 1 and 2, an average temperature of the power storage device can be decreased and an amount of time can be reduced in which the temperature of the power storage device stays high by delaying the timing to cancel the temperature control. Therefore, it becomes possible to alleviate the temperature stress exerted on the power storage device.

[First Embodiment]

(Structure of the Power Supply Device)

The first embodiment of the power supply device according to the invention now will be described by referring to the drawings below. FIG. 1 is a circuit diagram showing a power supply device 100 according to the first embodiment.

As shown in FIG. 1, the power supply device 100 has a plurality of power storage devices (power storage devices 10A to 10C), a plurality of switch elements (FETs 21A/22A to 21C/22C), a plurality of resistors (resistors 31A/32A to 31C/32C), a plurality of temperature detection units (NTC 40A to 40C), a plurality of resistors (resistors 41A to 41C) and a control unit 50.

The power storage devices 10A to 10C are connected in parallel and a load 110 is connected to the power storage devices 10A to 10C. The power storage devices 10A to 10C respectively have internal resistances Ra to Rc. For example, in a case in which the power supply device 100 is used in an electric vehicle (EV; Electric Vehicle, HEV; Hybrid Electric Vehicle), the load 110 is for example a motor provided in the electric vehicle.

Here, it should be noted that the circuit of the power storage device 10A and the circuit of the power storage device 10C have similar structures. In the following examples, the circuit of the power storage device 10A will be discussed.

The power storage device 10A is a device that stores electric charge. A positive electrode of the power storage device 10A is connected to a drain of the FET (Field Effect Transistor) 22A. A negative electrode of the power storage device 10A is connected to the load 110.

The FETs 21A/22A are field effect transistors each having a gate, a source, and a drain. The FETs 21A/22A are connected to the power storage device 10A in series, and switch the connection condition between the power storage device 10A and the load 110.

In the first embodiment, if the FETs 21A/22A are in the ON state, the power storage device 10A is connected to the load 110, and if the FETs 21A/22A, are in the OFF state, the power storage device 10A is disconnected or separated from the load 110.

The gates of the FETs 21A/22A are connected to the control unit 50 through the resistance 32A. The drain of the FET 21A is connected to the load 110 and the source of the FET 21A is connected to the source of the FET 22A and one end of the resistor 31A. The drain of the FET 22A is connected to the positive electrode of the power storage device 10A and the source of the FET 22A is connected to the source of the FET 21A and one end of the resistor 31A.

The NTC 40A is a thermistor that detects a temperature of the power storage device 10A. Here, as an example of a thermistor, a NTC (Negative Temperature Coefficient) thermistor is used. However, a PTC (Positive Temperature Coefficient) thermistor also may be used.

As the temperature of the NTC 40A increases, a resistance value of the NTC 40A decreases. In addition, the NTC 40A is provided in the vicinity of the power storage device 10A. In other words, the temperature of the NTC 40A is correlated to the temperature of the power storage device 10A.

The NTC 40A is connected to the drain of the FET 22A through the resistor 41A, and is connected in parallel with the power storage device 10A. The resistance value of the NTC 40A is obtained from a voltage $V_{T1}$ applied to the NTC 40A, and the temperature of the NTC 40A (that is, the temperature of the power storage device 10A) is obtained from the resistance value of the NTC 40A.

The control unit 50 performs a temperature control for increasing the time ratio of the OFF state in the control of the ON and OFF states of the switch elements (FET 21A/22A) based on the temperature of the power storage device 10A. In particular, the control unit 50 measures the temperature of the power storage device 10A from the voltage $V_{T1}$ applied to the NTC 40A. In addition, the control unit 50 performs a duty ratio control to decrease the duty ratio of the power storage device 10A based on the temperature of the power storage device 10A. In the first embodiment, in the temperature control the duty ratio is set as 0%.

The time ratio of the OFF state is a ratio of time in which the OFF state of the switch element occupies in unit time. Similarly, the duty ratio is a ratio in which the power storage device 10A is connected to the load 110 in unit time. In other words, the duty ratio is a ratio of time in which the ON state of the switch element occupies in unit time.

Conditions to start and cancel the temperature control are for example conditions (1) or conditions (2) as described below.

(Conditions 1)

In the conditions (1) of the first embodiment, the condition to start the temperature control is that the temperature of the power storage device 10A detected by the NTC 40A exceeds a start-control temperature Ts. The condition to cancel the temperature control is that the temperature of the power storage device 10A detected by the NTC 40A falls below a cancel-control temperature Te. Here, the cancel-control temperature Te is lower than the start-control temperature Ts and hystereses are provided.

Figure 2:
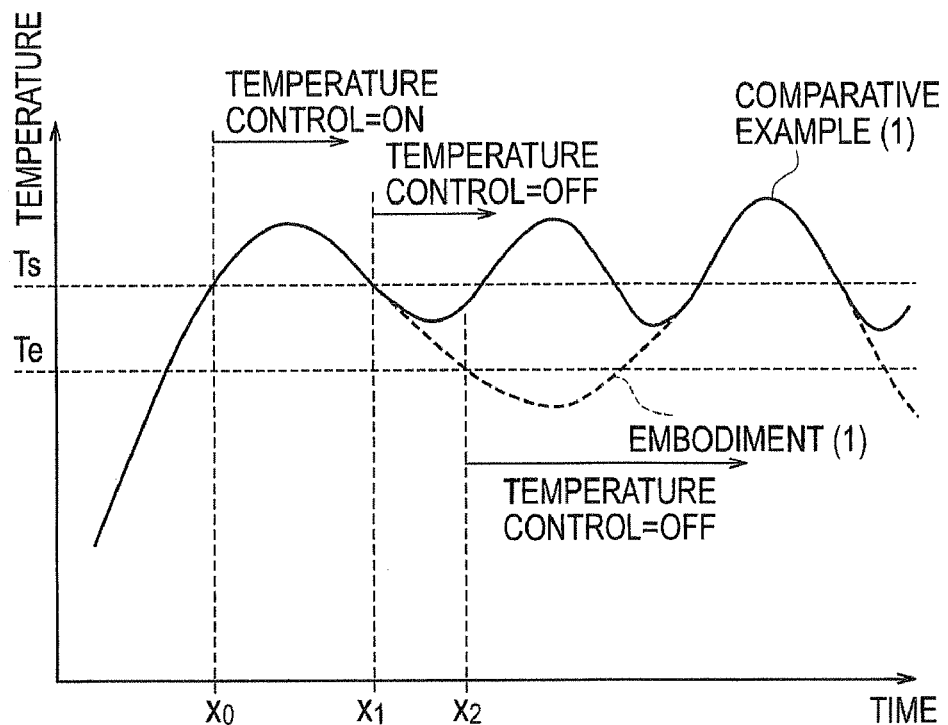
FIG. 2 is a diagram for explaining condition 1 concerning the first embodiment.

For example in a comparative example (1) as shown in FIG. 2, the temperature control is started at a timing that the temperature exceeds the start-control temperature Ts (for example at time $X_0$) and the temperature control is cancelled at a timing that the temperature falls below the cancel-control temperature Ts (for example at time $X_1$).

On the other hand, in the embodiment (1) as shown in FIG. 2, the temperature control is started at a timing that the temperature exceeds the start-control temperature Ts (for example at time $X_0$) and the temperature control is cancelled at a timing that the temperature falls below the cancel-control temperature Te (for example at time $X_2$) which is lower than start-control temperature Ts.

As can be seen in FIG. 2, in the embodiment (1), an average temperature of the power storage device 10A is decreased and the time during which the temperature of the power storage device 10A stays high is reduced by delaying the timing to cancel the temperature control, in other words, by lowering the cancel-control temperature as compared with the comparative example (1). Thus, the temperature stress exerted on the power storage device 10A is alleviated.

(Conditions 2)

In the conditions (2) of the first embodiment, the condition to start the temperature control is that the temperature of the power storage device 10A detected by the NTC 40A exceeds a control determination temperature Tj. The condition to cancel the temperature control is that the time elapsed after the temperature of the power storage device 10A detected by the NTC 40A falls below the control determination temperature Tj has reached a control determination time Td.

Figure 3:
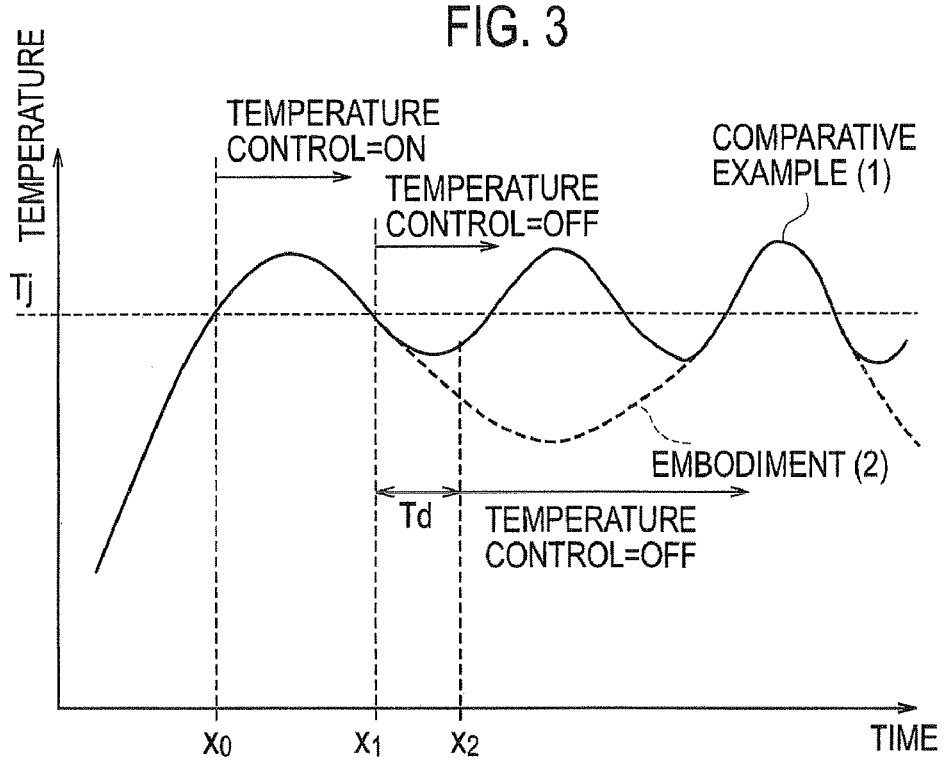
FIG. 3 is a diagram for explaining condition 2 concerning the first embodiment.

For example, in a comparative example (1) as shown in FIG. 3, the temperature control is started at a timing that the temperature exceeds the control determination temperature Tj (for example at time $X_0$) and the temperature control is cancelled at a timing that the temperature falls below the control determination temperature Tj (for example at time $X_1$).

On the other hand, in the embodiment (2) as shown in FIG. 3, the temperature control is started at a timing that the temperature exceeds the control determination temperature Tj (for example at time $X_0$) and the temperature control is cancelled when the time elapsed after the temperature falls below the control determination temperature Tj has reached the control determination time Td (for example at time $X_2$).

As can be seen in FIG. 3, in the embodiment (2), the temperature of the power storage device 10A at the time of canceling the temperature control becomes lower than the temperature of the power storage device 10A at the time of starting the temperature control (that is, the control determination temperature), and thus, an average temperature of the power storage device 10A is decreased and the time during which the temperature of the power storage device 10A stays high is reduced by delaying the timing to cancel the temperature control as compared with the comparative example (1). Thus, the temperature stress exerted on the power storage device 10A is alleviated.

(Operations of the Power Supply Device)

Figure 4:
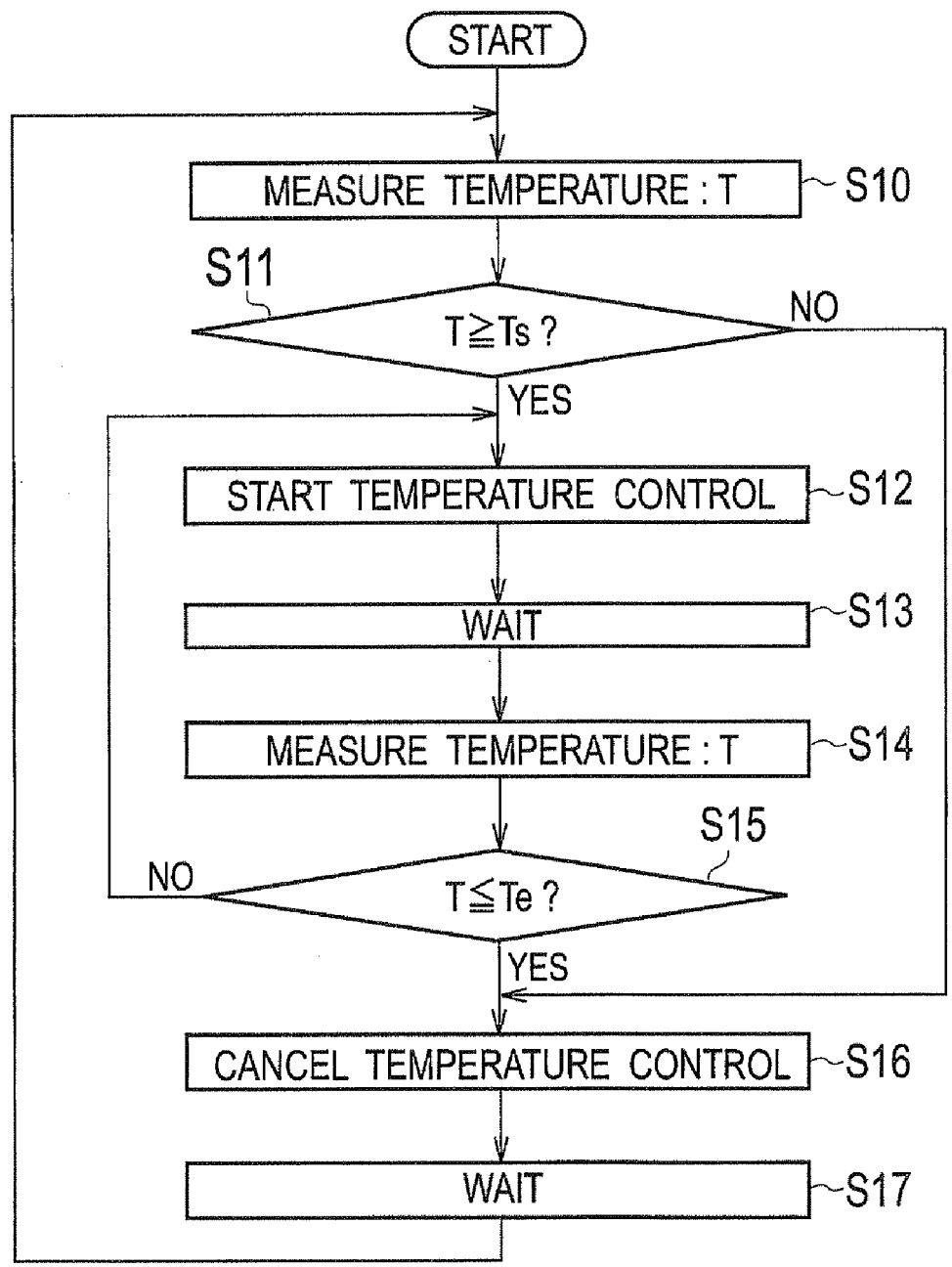
FIG. 4 is a flowchart showing operations of the control unit 50 concerning the first embodiment.
Figure 5:
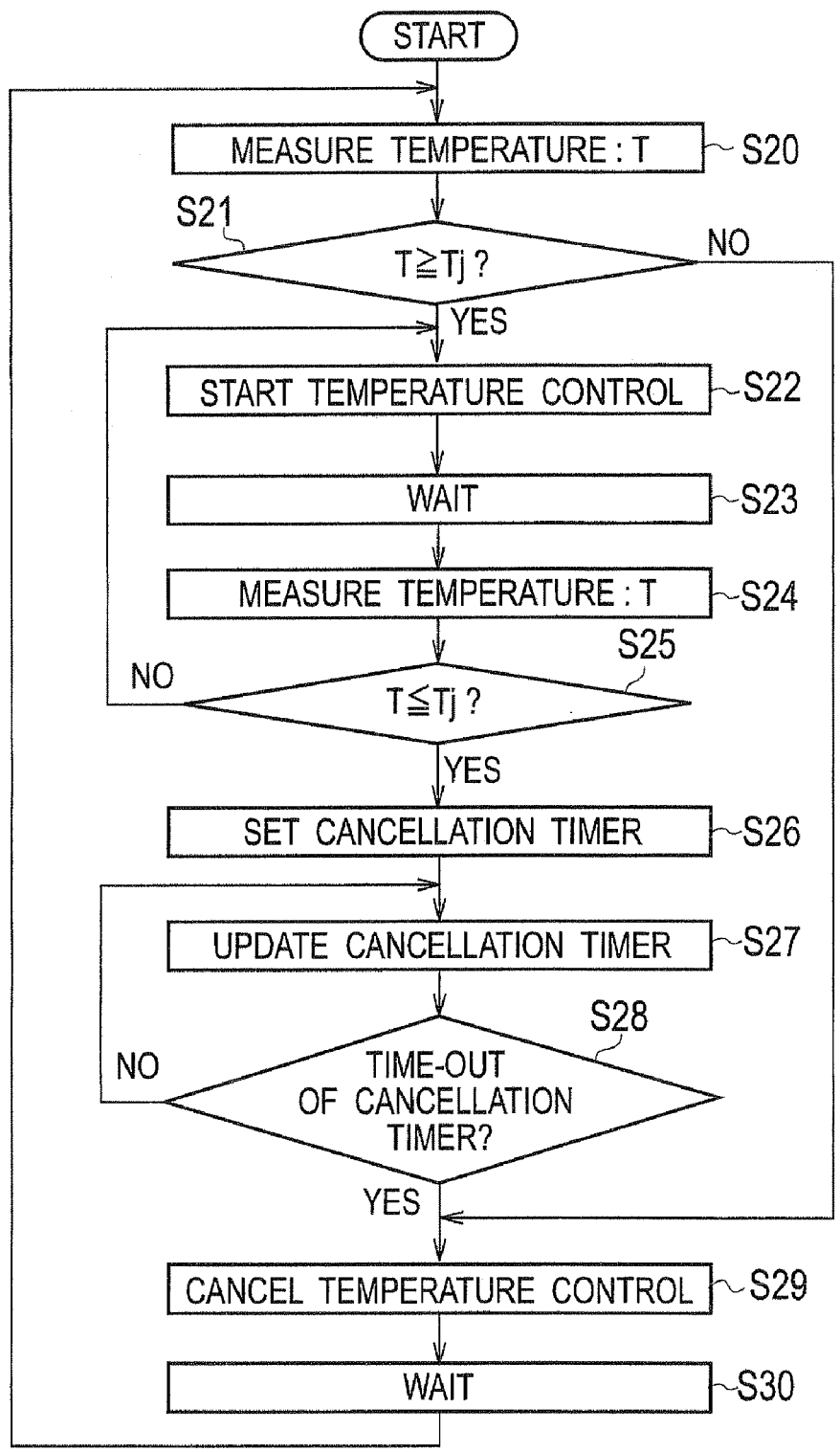
FIG. 5 is a flowchart showing operations of the control unit 50 concerning the first embodiment.

Operations of the power supply device concerning the first embodiment will be described by referring to the drawings below. FIGS. 4-5 are flowcharts showing operations of the power supply device 100 (the control unit 50) concerning the first embodiment.

In the first embodiment, an instance in which the power storage devices 10A to 100 are individually controlled is illustrated. Therefore, it should be noted that each of the power storage devices provided in the power supply device 100 will be referred to as a power storage device 10 without distinguishing the power storage devices 10A to 100. In other words, the power storage device 10 is one of the power storage devices 10A to 100.

In the description below, an example will be illustrated in which the duration of time of the OFF state is "0" in a normal state in controlling the ON and OFF states of the switch elements (FETs 21A/22A to 21C/22C). In other words, in the normal state, the duty ratio is "100%".

In the first embodiment, the duty ratio of 100% represents the ON state of the switch element, and the duty ratio of 0% represents the OFF state of the switch element, thus performing the temperature control only with the ON and OFF states.

Firstly, the conditions 1 as described above will be explained by referring to FIG. 4. As shown in FIG. 4, at step S10, the control unit 50 measures the temperature T of the power storage device 10.

At step S11, the control unit 50 determines whether or not the temperature T is above or equal to the start-control temperature Ts (for example 70° C.). If the temperature T is above or equal to the start-control temperature Ts, the control unit 50 advances the process to step S12. On the other hand, if the temperature T is below the start-control temperature Ts, the control unit 50 advances the process to step S16.

At step S12, the control unit 50 starts the temperature control for increasing the time ratio of the OFF state in controlling the ON and OFF states of the switch element. Here, the control unit 50 sets the duty ratio as 0%.

At step S13, the control unit 50 waits for a predetermined wait time (such as 5 seconds).

At step S14, the control unit 50 measures the temperature T of the power storage device 10.

At step S15, the control unit 50 determines whether or not the temperature T is below or equal to the cancel-control temperature Te (for example 60° C.). If the temperature T is below or equal to the cancel-control temperature Te, the control unit 50 advances the process to step S16. On the other hand, if the temperature T is above the cancel-control temperature Te, the control unit 50 returns the process back to step S12.

At step S16, the control unit 50 cancels the temperature control for increasing the time ratio of the OFF state in controlling the ON and OFF states of the switch element. Here, the control unit 50 sets the duty ratio as 100%.

At step S17, the control unit 50 waits for a predetermined wait time (such as 5 seconds). Subsequently, the control unit 50 returns the process back to step S10.

Secondly, the conditions 2 as described above will be explained by referring to FIG. 5. As shown in FIG. 5, at step S20, the control unit 50 measures the temperature T of the power storage device 10.

At step S21, the control unit 50 determines whether or not the temperature T is above or equal to the control determination temperature Tj (for example 70° C.). If the temperature T is above or equal to the control determination temperature Tj, the control unit 50 advances the process to step S22. On the other hand, if the temperature T is below the control determination temperature Tj, the control unit 50 advances the process to step S29.

At step S22, the control unit 50 starts the temperature control for increasing the time ratio of the OFF state in controlling the ON and OFF states of the switch element. Here, the control unit 50 sets the duty ratio as 0%.

At step S23, the control unit 50 waits for a predetermined wait time (such as 5 seconds).

At step S24, the control unit 50 measures the temperature T of the power storage device 10.

At step S25, the control unit 50 determines whether or not the temperature T is below or equal to the control determination temperature Tj. If the temperature T is below or equal to the control determination temperature Tj, the control unit 50 advances the process to step S26. On the other hand, if the temperature T is above the control determination temperature Tj, the control unit 50 returns the process back to step S22.

At step S26, the control unit 50 sets a cancellation timer. The cancellation timer may be a count up type or a count down type.

At step S27, the control unit 50 updates a value of the cancellation timer.

At step S28, the control unit 50 determines whether or not the cancellation timer has timed out. In other words, the control unit 50 determines whether or not the time elapsed from when the temperature T fell below the control determination temperature Tj has reached the control determination time Td (for example 5 minutes). If the cancellation timer has timed out, the control unit 50 advances the process to step S29. On the other hand, if the cancellation timer has not timed out, the control unit 50 returns the process back to step S27.

At step S29, the control unit 50 cancels the temperature control for increasing the time ratio of the OFF state in controlling the ON and OFF states of the switch element. Here, the control unit 50 sets the duty ratio as 100%.

At step S30, the control unit 50 waits for a predetermined wait time (such as 5 seconds). Subsequently, the control unit 50 returns the process back to step S20.

(Operations and Effects)

In the first embodiment, the control unit 50 performs the temperature control to decrease the duty ratio of the power storage device 10 based on the temperature of the power storage device 10. Therefore, temperature increases and temperature variations among each power storage device 10 can be reduced, and shortening of the life duration of the power supply device 100 as a whole can be restrained.

Under the conditions 1 of the first embodiment, the start-control temperature Ts and the cancel-control temperature Te have hystereses. Therefore, the control unit 50 can perform the temperature control stably and temperature increase of the power storage device 10 can be restrained.

Under the conditions 2 of the first embodiment, the control unit 50 cancels the temperature control if the time elapsed from when the temperature T falls below the control determination temperature Tj has reached the control determination time Td (for example 5 minutes). Therefore, the control unit 50 can perform the temperature control stably and temperature increase of the power storage device 10 can be restrained.

Therefore, in the first embodiment, as shown in the conditions 1 or 2, by delaying the timing to cancel the temperature control, the average temperature of the power storage device 10 is decreased and the amount of time in which the temperature of the power storage device 10 stays high is reduced.

Thus, the temperature stress exerted on the power storage device 10 is alleviated and deterioration of the power storage device 10 can be restrained.

Modified Example 1

A modified example 1 of the first embodiment now will be described below. In the modified example 1, differences with the first embodiment primarily will be explained.

In particular, in the modified example 1, the control unit 50 controls the switch element such that the temperature of the power storage device 10 does not exceed an allowable temperature for the power storage device 10 (hereinafter referred to as an "allowable temperature").

Here, the control unit 50 sets the duty ratio as 0% when the temperature T of the power storage device 10 exceeds a trip temperature Tt that is lower than the allowable temperature. Naturally, the trip temperature Tt is higher than the start-control temperature Ts and the control determination temperature Tj.

In addition, during the time between starting the temperature control and canceling the temperature control, unless the temperature of the power storage device 10 has reached the trip temperature Tt, the control unit 50 changes the duty ratio in the range between 0 and a standard duty ratio.

(Operations of the Power Supply Device)

Figure 6:
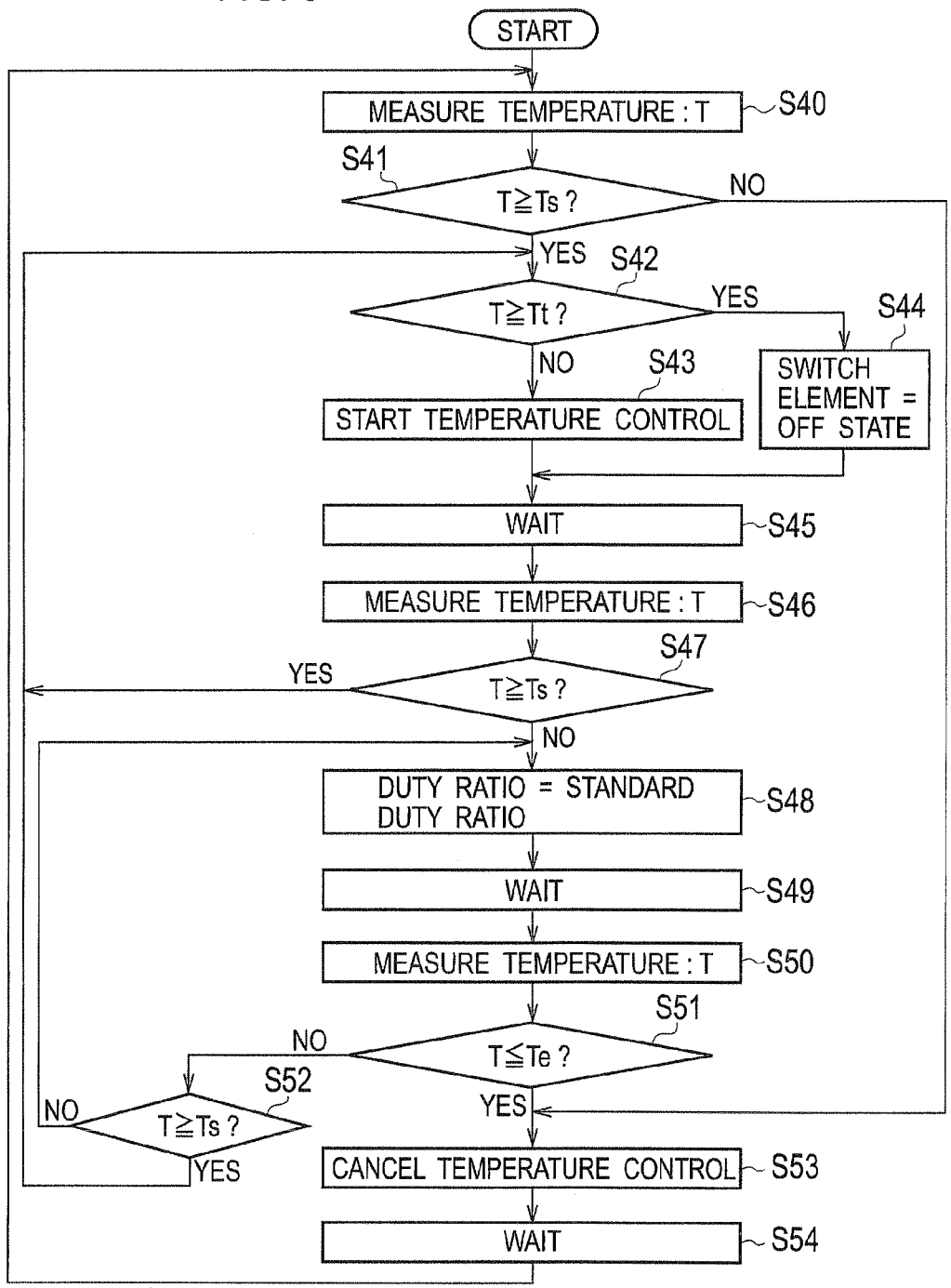
FIG. 6 is a flowchart showing operations of the control unit 50 concerning modified example 1 of the first embodiment.
Figure 7:
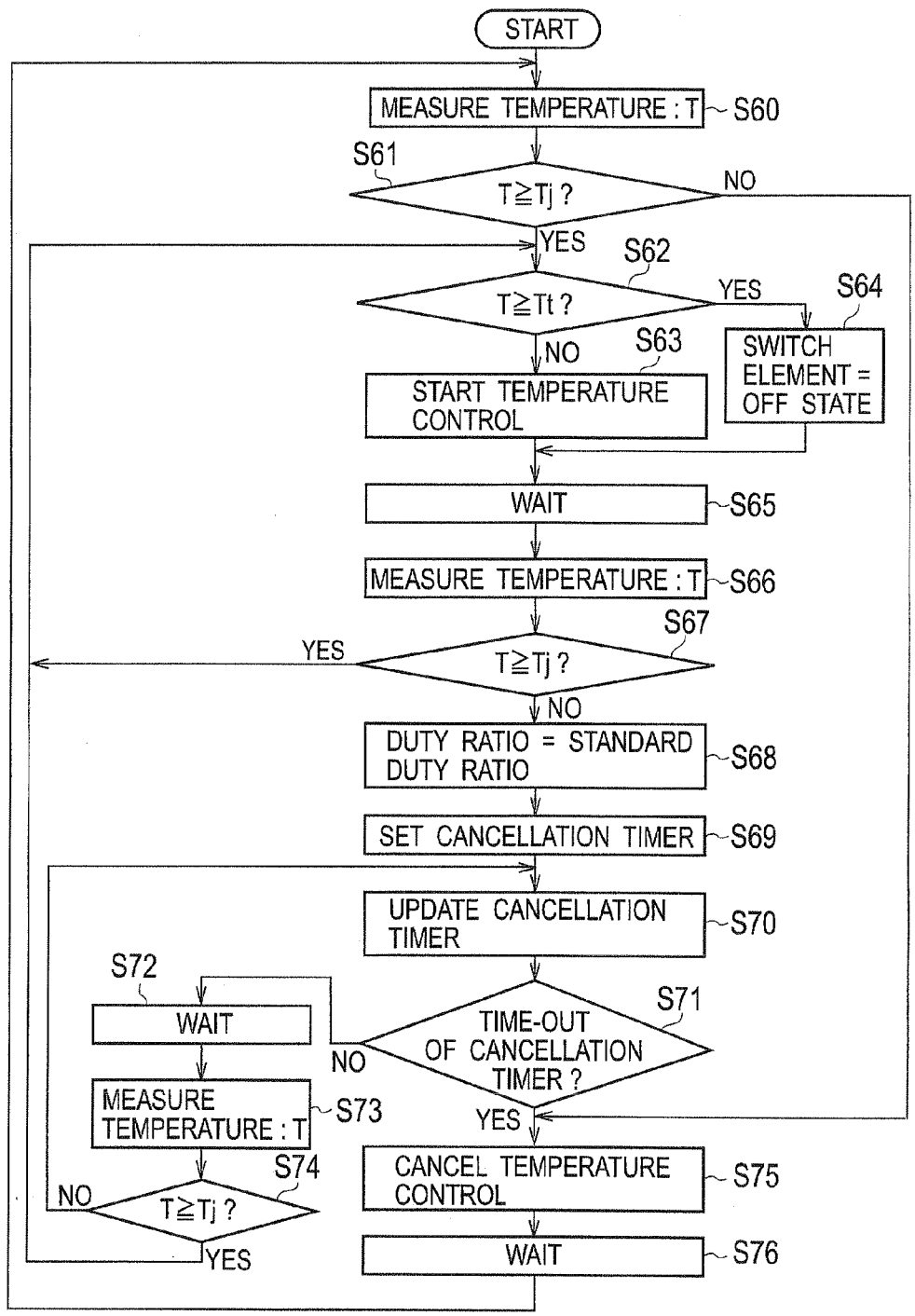
FIG. 7 is a flowchart showing operations of the control unit 50 concerning modified example 1 of the first embodiment.

Operations of the power supply device concerning the modified example 1 will be described by referring to the drawings below. FIGS. 6-7 are flowcharts showing operations of the power supply device 100 (the control unit 50) concerning the modified example 1.

Firstly, regarding the conditions 1 as described above, the operations will be explained by referring to FIG. 6. As shown in FIG. 6, at step S40, the control unit 50 measures the temperature T of the power storage device 10.

At step S41, the control unit 50 determines whether or not the temperature T is above or equal to the start-control temperature Ts (for example 70° C.). If the temperature T is above or equal to the start-control temperature Ts, the control unit 50 advances the process to step S42. On the other hand, if the temperature T is below the start-control temperature Ts, the control unit 50 advances the process to step S53.

At step S42, the control unit 50 determines whether or not the temperature T is above or equal to the trip temperature Tt (for example 80° C.). If the temperature T is above or equal to the trip temperature Tt, the control unit 50 advances the process to step S44. On the other hand, if the temperature T is below the trip temperature Tt, the control unit 50 advances the process to step S43.

At step S43, the control unit 50 starts the temperature control for increasing the time ratio of the OFF state in controlling the ON and OFF states of the switch element. Here, the control unit 50 sets the duty ratio as "80×{1−(T−Ts)/(Tt−Ts)}"%. In addition, "80%" is the standard duty ratio in the temperature control.

At step S44, the control unit 50 makes the state of the switch element to be the OFF state. In other words, the control unit 50 sets the duty ratio as 0%. Here, it should be noted that the control to put the switch element in the OFF state is one embodiment of the temperature control. That is, at step S44, the control unit 50 starts the temperature control.

At step S45, the control unit 50 waits for a predetermined wait time (such as 5 seconds).

At step S46, the control unit 50 measures the temperature T of the power storage device 10.

At step S47, the control unit 50 determines whether or not the temperature T is above or equal to the start-control temperature Ts. If the temperature T is above or equal to the start-control temperature Ts, the control unit 50 returns the process back to step S42. On the other hand, if the temperature T is below the start-control temperature Ts, the control unit 50 advances the process to step S48.

At step S48, the control unit 50 sets the duty ratio to be the standard duty ratio in the temperature control (for example 80%).

At step S49, the control unit 50 waits for a predetermined wait time (such as 5 seconds).

At step S50, the control unit 50 measures the temperature T of the power storage device 10.

At step S51, the control unit 50 determines whether or not the temperature T is below or equal to the cancel-control temperature Te (for example 60° C.). If the temperature T is below or equal to the cancel-control temperature Te, the control unit 50 advances the process to step S53. On the other hand, if the temperature T is above the cancel-control temperature Te, the control unit 50 advances the process to step S52.

At step S52, the control unit 50 determines whether or not the temperature T is above or equal to the start-control temperature Ts. If the temperature T is above or equal to the start-control temperature Ts, the control unit 50 returns the process back to step S42. On the other hand, if the temperature T is below the start-control temperature Ts, the control unit 50 returns the process back to step S48.

At step S53, the control unit 50 cancels the temperature control for increasing the time ratio of the OFF state in controlling the ON and OFF states of the switch element. Here, the control unit 50 sets the duty ratio as 100%.

At step S54, the control unit 50 waits for a predetermined wait time (such as 5 seconds). Subsequently, the control unit 50 returns the process back to step S40.

Secondly, regarding the conditions 2 as described above, operations will be explained by referring to FIG. 7. As shown in FIG. 7, at step S60, the control unit 50 measures the temperature T of the power storage device 10.

At step S61, the control unit 50 determines whether or not the temperature T is above or equal to the control determination temperature Tj (for example 70° C.). If the temperature T is above or equal to the control determination temperature Tj, the control unit 50 advances the process to step S62. On the other hand, if the temperature T is below the control determination temperature Tj, the control unit 50 advances the process to step S75.

At step S62, the control unit 50 determines whether or not the temperature T is above or equal to the trip temperature Tt (for example 80° C.). If the temperature T is above or equal to the trip temperature Tt, the control unit 50 advances the process to step S64. On the other hand, if the temperature T is below the trip temperature Tt, the control unit 50 advances the process to step S63.

At step S63, the control unit 50 starts the temperature control for increasing the time ratio of the OFF state in controlling the ON and OFF states of the switch element. Here, the control unit 50 sets the duty ratio as "80×{1−(T−Ts)/(Tt−Ts)}"%. In addition, "80%" is the standard duty ratio in the temperature control.

At step S64, the control unit 50 makes the state of the switch element to be the OFF state. In other words, the control unit 50 sets the duty ratio as 0%. Here, it should be noted that the control to make the switch element to be the OFF state is one embodiment of the temperature control. That is, at step S64, the control unit 50 starts the temperature control.

At step S65, the control unit 50 waits for a predetermined wait time (such as 5 seconds).

At step S66, the control unit 50 measures the temperature T of the power storage device 10.

At step S67, the control unit 50 determines whether or not the temperature T is above or equal to the control determination temperature Tj. If the temperature T is above or equal to the control determination temperature Tj, the control unit 50 returns the process back to step S62. On the other hand, if the temperature T is below the control determination temperature Tj, the control unit 50 advances the process to step S68.

At step S68, the control unit 50 sets the duty ratio to be the standard duty ratio in the temperature control (for example 80).

At step S69, the control unit 50 sets a cancellation timer. The cancellation timer may be a count up type or a count down type.

At step S70, the control unit 50 updates a value of the cancellation timer.

At step S71, the control unit 50 determines whether or not the cancellation timer has timed out. In other words, the control unit 50 determines whether or not the time elapsed from when the temperature T fell below the control determination temperature Tj has reached the control determination time Td (for example 5 minutes). If the cancellation timer has timed out, the control unit 50 advances the process to step S75. On the other hand, if the cancellation timer has not timed out, the control unit 50 advances the process to step S72. At step S72, the control unit 50 waits for a predetermined wait time (such as 5 seconds).

At step S73, the control unit 50 measures the temperature T of the power storage device 10.

At step S74, the control unit 50 determines whether or not the temperature T is above or equal to the control determination temperature Tj. If the temperature T is above or equal to the control determination temperature Tj, the control unit 50 returns the process back to step S62. On the other hand, if the temperature T is below the control determination temperature Tj, the control unit 50 returns the process back to step S70.

At step S75, the control unit 50 cancels the temperature control for increasing the time ratio of the OFF state in controlling the ON and OFF states of the switch element. Here, the control unit 50 sets the duty ratio as 100%.

At step S76, the control unit 50 waits for a predetermined wait time (such as 5 seconds). Subsequently, the control unit 50 returns the process back to step S60.

(Operations and Effects)

In the modified example 1, the duty ratio of the power storage device 10 is set to be 0 when the temperature of the power storage device 10 has reached the trip temperature Tt. In addition, the control unit 50 changes the duty ratio in the range between 0 and the standard duty ratio during the time between starting the temperature control and canceling the temperature control, if the temperature of the power storage device 10 has not reached the trip temperature Tt.

Thus, effects similar to that of the first embodiment can be achieved. In addition, since the duty ratio can be dynamically controlled in the temperature control, the load that is applied to the normal power storage device 10 can be scattered and alleviated.

Modified Example 2

A modified example 2 of the first embodiment will be described below. In the modified example 2, differences with the modified example 1 primarily will be explained. However, naturally the modified example 2 is applicable to the first embodiment also.

In the modified example 2, if a repeat count in starting and canceling the temperature control has reached a predetermined number of times, the control unit 50 determines that the power storage device 10 is an abnormal power storage device. In particular, in the modified example 2, if the number of times N that the temperature control was started within a first determination time TN1 has reached a predetermined number of times NN, the control unit 50 locks the switch element in the OFF state and does not bring back the power storage device 10.

(Operations of the Power Supply Device)

Figure 8:
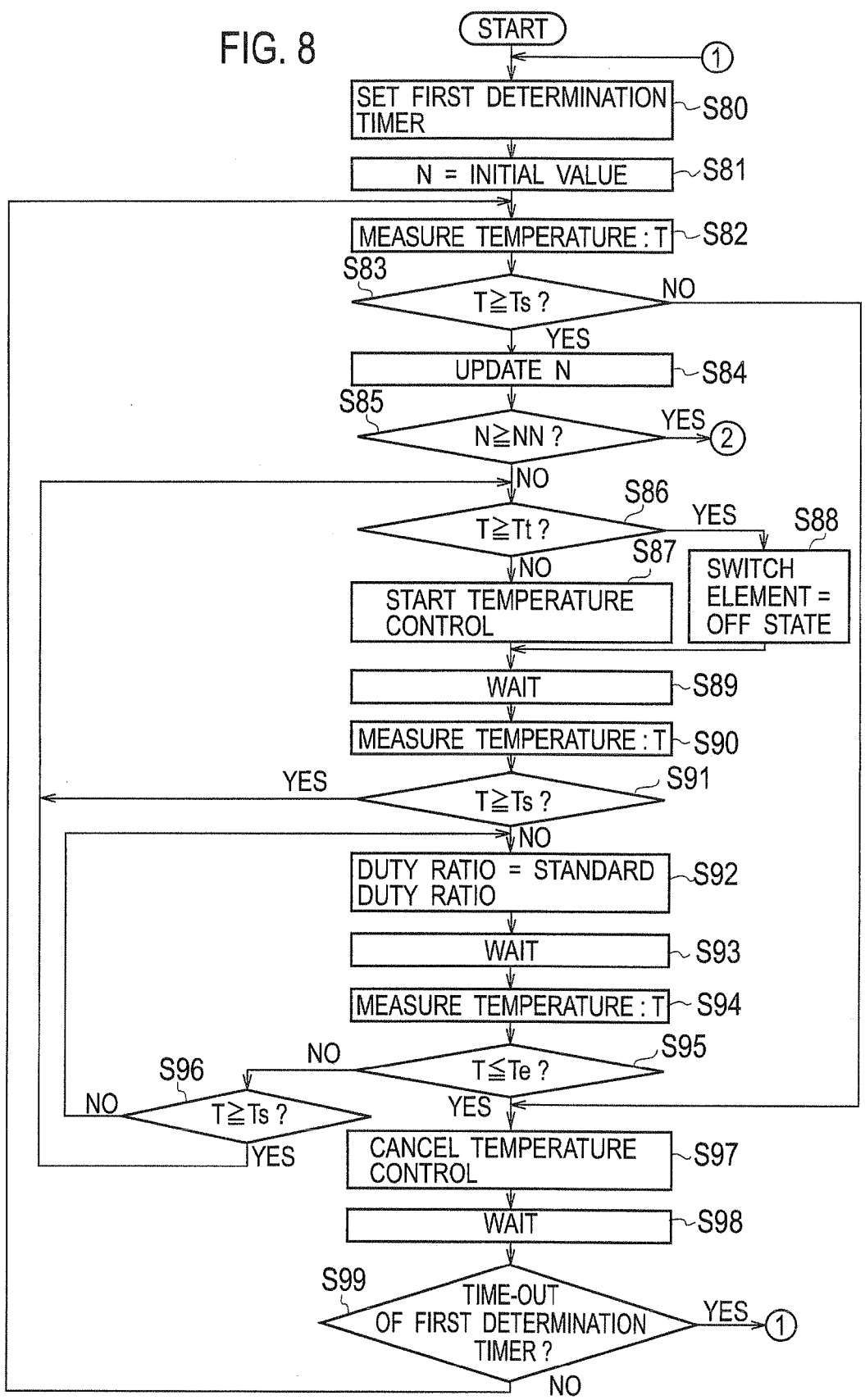
FIG. 8 is a flowchart showing operations of the control unit 50 concerning modified example 2 of the first embodiment.
Figure 9:
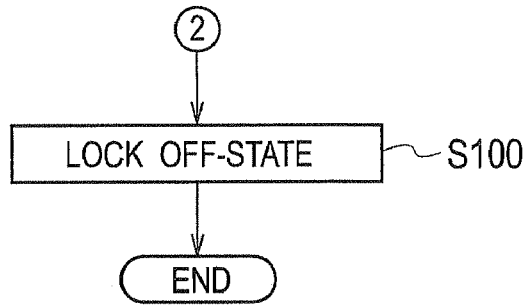
FIG. 9 is a flowchart showing operations of the control unit 50 concerning modified example 2 of the first embodiment.

Operations of the power supply device concerning the modified example 2 will be described by referring to the drawings below. FIGS. 8-9 are flowcharts showing operations of the power supply device 100 (the control unit 50) concerning the modified example 2. While the modified example 2 will be described with respect to the above-described conditions 1, naturally the modified example 2 also is applicable to the conditions 2.

As shown in FIG. 8, at step S80, the control unit 50 sets the first determination timer. The first determination timer is a timer that times the first determination time TN1 (for example 2 hours), which may be a count-up type or a count-down type.

At step S81, the control unit 50 sets an initial value (for example "0") as a repeat count N.

At step S82, the control unit 50 measures the temperature T of the power storage device 10.

At step S83, the control unit 50 determines whether or not the temperature T is above or equal to the start-control temperature Ts (for example 70° C.). If the temperature T is above or equal to the start-control temperature Ts, the control unit 50 advances the process to step S84. On the other hand, if the temperature T is below the start-control temperature Ts, the control unit 50 advances the process to step S97.

At step S84, the control unit 50 updates the repeat count N. Here, the control unit 50 adds "1" to the repeat count N.

At step S85, the control unit 50 determines whether or not the repeat count N is above or equal to the predetermined number of times NN (for example 3 times). If the repeat count N is above or equal to the predetermined number of times NN, the control unit 50 advances the process to step S100 (see FIG. 9). On the other hand, if the repeat count N is below the predetermined number of times NN, the control unit 50 advances the process to step S86.

At step S86, the control unit 50 determines whether or not the temperature T is above or equal to the trip temperature Tt (for example 80° C.). If the temperature T is above or equal to the trip temperature Tt, the control unit 50 advances the process to step S88. On the other hand, if the temperature T is below the trip temperature Tt, the control unit 50 advances the process to step S87.

At step S87, the control unit 50 starts the temperature control for increasing the time ratio of the OFF state in controlling the ON and OFF states of the switch element. Here, the control unit 50 sets the duty ratio as "80×{1−(T−Ts)/(Tt−Ts)}"%. In addition, "80%" is the standard duty ratio in the temperature control.

At step S88, the control unit 50 puts the switch element in the OFF state. In other words, the control unit 50 sets the duty ratio as 0%. Here, it should be noted that the control to put the switch element in the OFF state is one embodiment of the temperature control. That is, at step S88, the control unit 50 starts the temperature control.

At step S89, the control unit 50 waits for a predetermined wait time (such as 5 seconds).

At step S90, the control unit 50 measures the temperature T of the power storage device 10.

At step S91, the control unit 50 determines whether or not the temperature T is above or equal to the start-control temperature Ts. If the temperature T is above or equal to the start-control temperature Ts, the control unit 50 returns the process back to step S86. On the other hand, if the temperature T is below the start-control temperature Ts, the control unit 50 advances the process to step S92.

At step S92, the control unit 50 sets the duty ratio to be the standard duty ratio in the temperature control (for example 80%). At step S93, the control unit 50 waits for a predetermined wait time (such as 5 seconds).

At step S94, the control unit 50 measures the temperature T of the power storage device 10.

At step S95, the control unit 50 determines whether or not the temperature T is below or equal to the cancel-control temperature Te (for example 60° C.). If the temperature T is below or equal to the cancel-control temperature Te, the control unit 50 advances the process to step S97. On the other hand, if the temperature T is above the cancel-control temperature Te, the control unit 50 advances the process to step S96.

At step S96, the control unit 50 determines whether or not the temperature T is above or equal to the start-control temperature Ts. If the temperature T is above or equal to the start-control temperature Ts, the control unit 50 returns the process back to step S86. On the other hand, if the temperature T is below the start-control temperature Ts, the control unit 50 returns the process back to step S92.

At step S97, the control unit 50 cancels the temperature control for increasing the time ratio of the OFF state in controlling the ON and OFF states of the switch element. Here, the control unit 50 sets the duty ratio as 100%.

At step S98, the control unit 50 waits for a predetermined wait time (such as 5 seconds).

At step S99, the control unit 50 determines whether or not the first determination timer has timed out. In other words, the control unit 50 determines whether or not the first determination time TN1 has elapsed. If the first determination timer has timed out, the control unit 50 returns the process to step S80. On the other hand, if the first determination time has not timed out, the control unit 50 returns the process to step S82.

As shown in FIG. 9, at step S100, the control unit 50 locks the switch element in the OFF state and ends the sequence of the processes. In other words, the control unit 50 sets the duty ratio as 0% and does not bring back the power storage device 10.

(Operations and Effects)

In the modified example 2, when the number of times N that the temperature control was started within the first determination time TN1 has reached the predetermined number of times NN, the control unit 50 locks the switch element in the OFF state and does not reconnect the power storage device 10 to the load. In other words, it becomes possible to restrain reuse of the power storage device 10 that was determined as the abnormal power storage device, thereby improving the safety of the power supply device 100. In addition, naturally similar effects as that described in the first embodiment also can be achieved.

Modified Example 3

A modified example 3 of the first embodiment now will be described below. In the modified example 3, differences with the modified example 2 primarily will be explained.

In the modified example 3, if a repeat count in starting and canceling the temperature control has reached a predetermined value, the control unit 50 determines that the power storage device 10 is an abnormal power storage device. In particular, in the modified example 3, if the number of times N that the temperature control was started within the first determination time TN1 has reached a predetermined number of times NN, the control unit 50 locks the switch element in the OFF state and separates the power storage device 10. In addition, the control unit 50 cancels the lock in the OFF state of the switch element and brings back the power storage device 10 when a second determination time TN2 has elapsed after the power storage device 10 is separated.

(Operations of the Power Supply Device)

Figure 10:
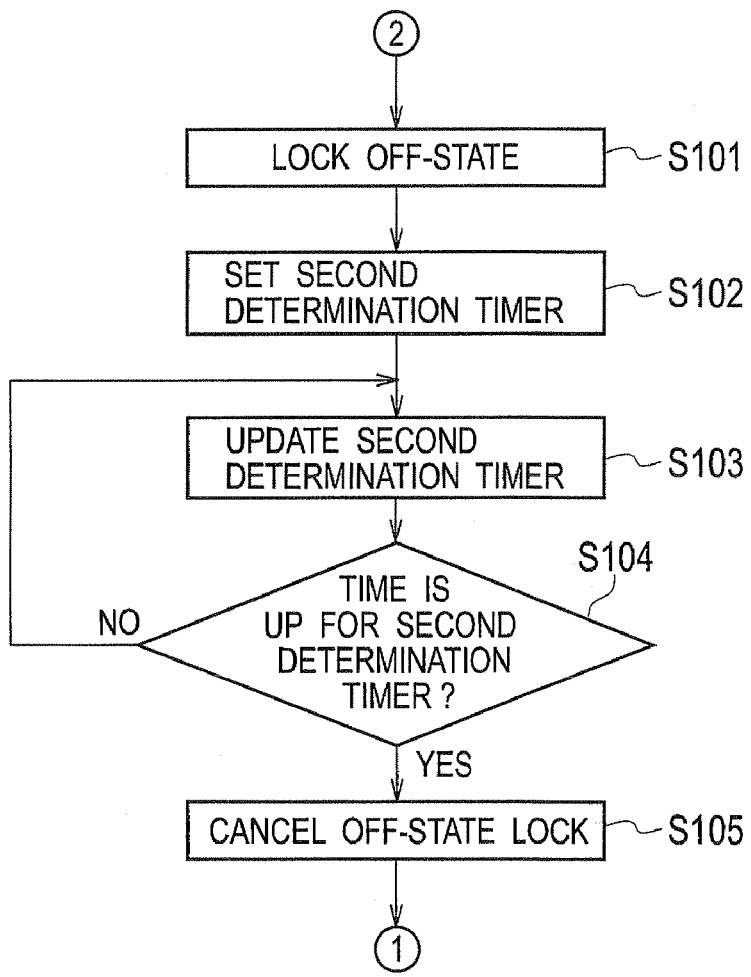
FIG. 10 is a flowchart showing operations of the control unit 50 concerning modified example 3 of the first embodiment.

Operations of the power supply device concerning the modified example 3 will be described by referring to the drawings below. FIG. 10 is a flowchart showing operations of the power supply device 100 (the control unit 50) concerning the modified example 3. While the modified example 3 will be described with respect to the above-described conditions 1, naturally the modified example 3 also is applicable to the conditions 2.

Since the processes of steps S80 to S99 are the same as those in the modified example 2, their explanations are omitted. The flow as shown in FIG. 10 is performed when the number of times N that the temperature control was started within the first determination time TN1 reached the predetermined number of times NN (for example 3 times).

As shown in FIG. 10, at step S101, the control unit 50 locks the switch element in the OFF state and separates the power storage device 10. In other words, the control unit 50 sets the duty ratio as 0%.

At step S102, the control unit 50 sets a second determination timer. The second determination timer is a timer that times the second determination time TN2 (for example 30 minutes), which may be a count up type or a count down type. Preferably, the second determination time TN2 is an amount of time that is necessary for the temperature and the usage state of the power storage device 10 to be stabilized.

At step S103, the control unit 50 updates the value of the second determination timer.

At step S104, the control unit 50 determines whether or not the time is up for the second determination timer. In other words, the control unit 50 determines whether or not the second determination time TN2 has elapsed since the power storage device 10 was separated. If the time is up for the second determination timer, the control unit 50 advances the process to step S105. On the other hand, if the time is not up for the second determination timer, the control unit 50 repeats the processes of step S103 and step S104.

At step S105, the control unit 50 cancels the lock in the OFF state of the switch element, returns the process back to step S80 (see FIG. 8), and brings back the power storage device 10.

(Operations and Effects)

In the modified example 3, when the number of times N that the temperature control was started within the first determination time TN1 has reached the predetermined number of times NN, the control unit 50 locks the switch element in the OFF state and separates the power storage device 10. In addition, the control unit 50 cancels the lock in the OFF state of the switch element and rejoins the power storage device 10 if the second determination time TN2 has elapsed after the power storage device 10 was separated.

In other words, the power storage device 10 that was determined as the abnormal power storage device is reused after the temperature and the usage state of the power storage device 10 has been stabilized by interrupting the use of the power storage device 10 determined as the abnormal power storage device for a while. Therefore, it becomes possible to restrain capacity decline of the power supply device 100 and to alleviate the load exerted on the normal power storage device 10.

Modified Example 4

A modified example 4 of the first embodiment will be described below. In the modified example 4, differences with the modified example 3 will be primarily explained. However, the modified example 4 is applicable to the first embodiment also.

In the modified example 4, if a repeat count in starting and canceling the temperature control has reached a predetermined number of times, the control unit 50 determines that the power storage device 10 is a abnormal power storage device. In particular, in the modified example 4, if the number of times N that the temperature control was started within a first determination time TN1 has reached a predetermined number of times NN, the control unit 50 locks the switch element in the OFF state and separates the power storage device 10. In addition, the control unit 50 cancels the lock in the OFF state of the switch element and rejoins the power storage device 10 when a second determination time TN2 has elapsed after the power storage device 10 is separated from the power supply device. Furthermore, if the number of times M that the power storage device 10 was separated has reached a predetermined number MM, the control unit 50 does not cancel the lock in the OFF state of the switch element and does not rejoin the power storage device 10.

(Operations of the Power Supply Device)

Figure 11:
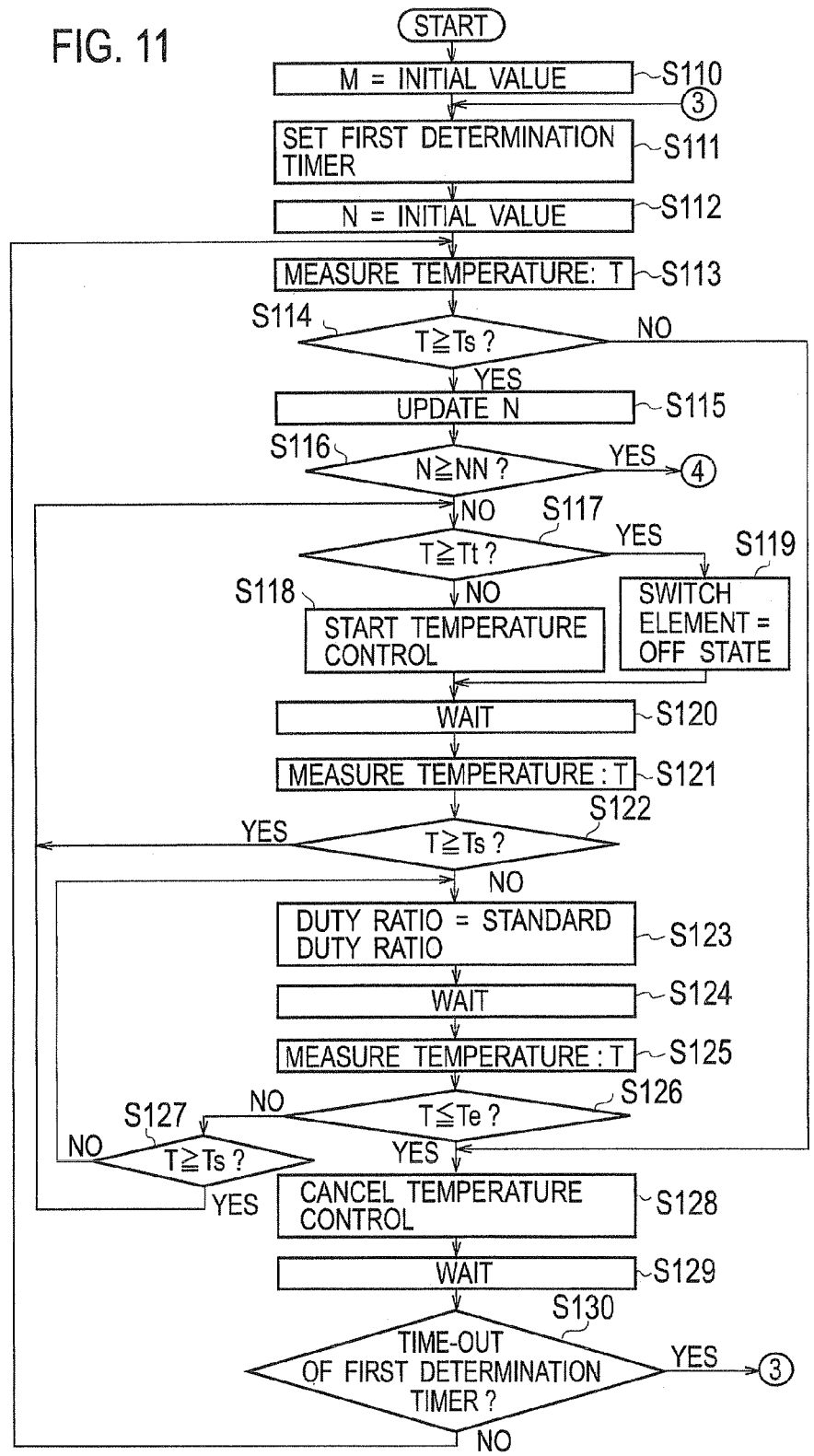
FIG. 11 is a flowchart showing operations of the control unit 50 concerning modified example 4 of the first embodiment.
Figure 12:
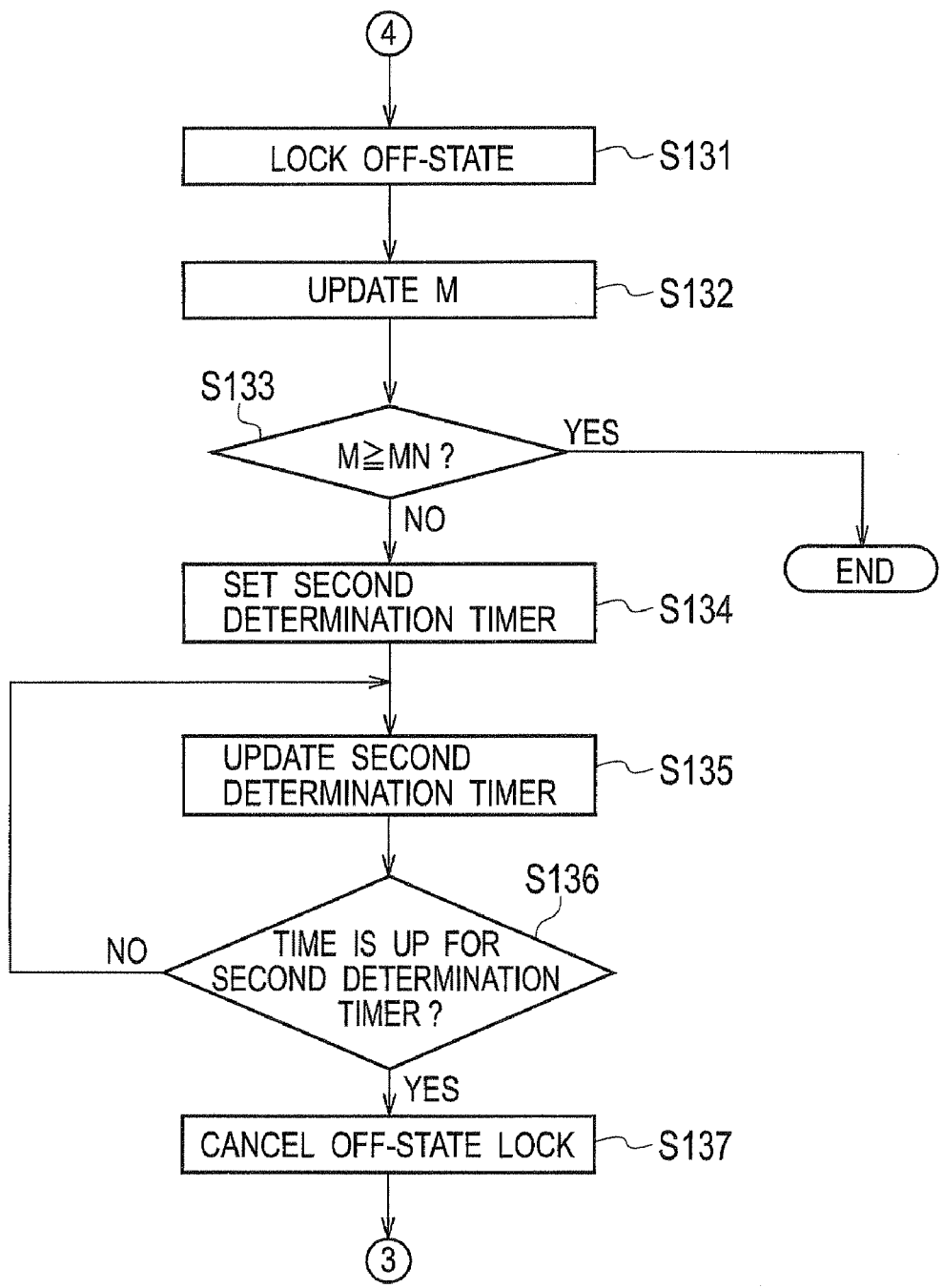
FIG. 12 is a flowchart showing operations of the control unit 50 concerning modified example 4 of the first embodiment.

Operations of the power supply device concerning the modified example 4 will be described by referring to the drawings below. FIGS. 11 to 12 are flowcharts showing operations of the power supply device 100 (the control unit 50) concerning the modified example 4. While the modified example 4 will be described with respect to the above-described conditions 1, the modified example 4 also is applicable to the conditions 2.

As shown in FIG. 11, at step S110, the control unit 50 sets an initial value (for example "0") as a number of times M that the power storage device 10 is separated.

At step S111, the control unit 50 sets the first determination timer. The first determination timer is a timer that times the first determination time TN1 (for example 2 hours), which may be a count up type or a count down type.

At step S112, the control unit 50 sets an initial value (for example "0") as a repeat count N.

At step S113, the control unit 50 measures the temperature T of the power storage device 10.

At step S114, the control unit 50 determines whether or not the temperature T is above or equal to the start-control temperature Ts (for example 70° C.). If the temperature T is above or equal to the start-control temperature Ts, the control unit 50 advances the process to step S115. On the other hand, if the temperature T is below the start-control temperature Ts, the control unit 50 advances the process to step S128.

At step S115, the control unit 50 updates the repeat count N. Here, the control unit 50 adds "1" to the repeat count N.

At step S116, the control unit 50 determines whether or not the repeat count N is above or equal to the predetermined number of times NN (for example 3 times). If the repeat count N is above or equal to the predetermined number of times NN, the control unit 50 advances the process to step S131 (see FIG. 12). On the other hand, if the repeat count N is below the predetermined number of times NN, the control unit 50 advances the process to step S117.

At step S117, the control unit 50 determines whether or not the temperature T is above or equal to the trip temperature Tt (for example 80° C.). If the temperature T is above or equal to the trip temperature Tt, the control unit 50 advances the process to step S119. On the other hand, if the temperature T is below the trip temperature Tt, the control unit 50 advances the process to step S118.

At step S118, the control unit 50 starts the temperature control for increasing the time ratio of the OFF state in controlling the ON and OFF states of the switch element. Here, the control unit 50 sets the duty ratio as "80×{1−(T−Ts)/(Tt−Ts)}"%. In addition, "80%" is the standard duty ratio in the temperature control.

At step S119, the control unit 50 makes the state of the switch element to be the OFF state. In other words, the control unit 50 sets the duty ratio as 0%. Here, it should be noted that the control to make the switch element to be the OFF state is one embodiment of the temperature control. That is, at step S119, the control unit 50 starts the temperature control.

At step S120, the control unit 50 waits for a predetermined wait time (such as 5 seconds).

At step S121, the control unit 50 measures the temperature T of the power storage device 10.

At step S122, the control unit 50 determines whether or not the temperature T is above or equal to the start-control temperature Ts. If the temperature T is above or equal to the start-control temperature Ts, the control unit 50 returns the process back to step S117. On the other hand, if the temperature T is below the start-control temperature Ts, the control unit 50 advances the process to step S123.

At step S123, the control unit 50 sets the duty ratio to be the standard duty ratio in the temperature control (for example 80%).

At step S124, the control unit 50 waits for a predetermined wait time (such as 5 seconds).

At step S125, the control unit 50 measures the temperature T of the power storage device 10.

At step S126, the control unit 50 determines whether or not the temperature T is below or equal to the cancel-control temperature Te (for example 60° C.). If the temperature T is below or equal to the cancel-control temperature Te, the control unit 50 advances the process to step S128. On the other hand, if the temperature T is above the cancel-control temperature Te, the control unit 50 advances the process to step S127.

At step S127, the control unit 50 determines whether or not the temperature T is above or equal to the start-control temperature Ts. If the temperature T is above or equal to the start-control temperature Ts, the control unit 50 returns the process back to step S117. On the other hand, if the temperature T is below the start-control temperature Ts, the control unit 50 returns the process back to step S123.

At step S128, the control unit 50 cancels the temperature control for increasing the time ratio of the OFF state in controlling the ON and OFF states of the switch element. Here, the control unit 50 sets the duty ratio as 100%.

At step S129, the control unit 50 waits for a predetermined wait time (such as 5 seconds).

At step S130, the control unit 50 determines whether or not the first determination timer has timed out. In other words, the control unit 50 determines whether or not the first determination time TN1 has elapsed. If the first determination timer has timed out, the control unit 50 returns the process to step S111. On the other hand, if the first determination time has not timed out, the control unit 50 returns the process to step S113.

As shown in FIG. 12, at step S131, the control unit 50 locks the switch element in the OFF state and separates the power storage device 10. In other words, the control unit 50 sets the duty ratio as 0%.

At step S132, the control unit 50 updates the number of separation M. Here, the control unit 50 adds "1" to the number of separation M.

At step S133, the control unit 50 determines whether or not the number of separations M is above or equal to a predetermined number of times MN (for example 3 times). If the number of separations M is above or equal to the predetermined number of times MN, the control unit 50 ends the sequence of the processes and does not rejoin the power storage device 10 without canceling the lock in the OFF state of the switch element. On the other hand, if the number of separations M is below the predetermined number of times MN, the control unit 50 advances the process to step S134.

At step S134, the control unit 50 sets the second determination timer. The second determination timer is a timer that times the second determination time TN2 (for example 30 minutes), which may be a count up type or a count down type.

At step S135, the control unit 50 updates the value of the second determination timer.

At step S136, the control unit 50 determines whether or not the time is up for the second determination timer. In other words, the control unit 50 determines whether or not the second determination time TN2 has elapsed since the power storage device 10 was separated. If the time is up for the second determination timer, the control unit 50 advances the process to step S137. On the other hand, if the time is not up for the second determination timer, the control unit 50 repeats the processes of step S135 and step S136.

At step S137, the control unit 50 cancels the lock in the OFF state of the switch element, returns the process back to step S111 (see FIG. 11), and brings back the power storage device 10.

(Operations and Effects)

In the modified example 4, if the number of times N that the temperature control was started within the first determination time TN1 has reached the predetermined number of times NN, the control unit 50 locks the switch element in the OFF state and separates the power storage device 10. In addition, the control unit 50 cancels the lock in the OFF state of the switch element and brings back the power storage device 10 if the second determination time TN2 has elapsed after the power storage device 10 was separated.

In other words, the power storage device 10 that was determined as the abnormal power storage device is reused after the temperature and the usage state of the power storage device 10 has been stabilized by interrupting the use of the power storage device 10 determined as the abnormal power storage device for a while. Therefore, it becomes possible to reduce capacity decline of the power supply device 100 and to alleviate the load exerted on the normal power storage device 10.

Moreover, the control unit 50 determines that the power storage device 10 with the number of separation M that reached the predetermined number of times MN to be an abnormal power storage device 10. In particular, when the number of separation M has reached the predetermined number of times MN, the control unit 50 keeps the lock in the OFF state of the switch element and does not bring back the power storage device 10.

In other words, by restricting the rejoinder of the power storage device determined as being an abnormal power storage device 10 by separating the power storage device 10 with recurrent temperature increase from the power supply device, it becomes possible to prevent the reuse of a power storage device 10 determined as being defective, thus improving the safety of the power supply device 100.

Modified Example 5

A modified example 5 of the first embodiment will be described below. In the modified examples, differences with the modified example 1 will be primarily explained. However, naturally the modified example 5 is applicable to the first embodiment also.

In the modified example 5, if a repeat count in starting and canceling the temperature control has reached a predetermined number of Limes, the control unit 50 determines that the power storage device is an abnormal power storage device. In particular, in the modified example 5, when the number of times N that the temperature control was started within the first determination time TN1 has reached a predetermined number of times NN, the control unit 50 changes the conditions in the temperature control (hereinafter referred to as "temperature control conditions").

Here, for the abnormal power storage device, the control unit 50 changes the temperature control conditions to more strict conditions. In other words, the control unit 50 changes the temperature control conditions to the conditions that are more resistant to the temperature increase of the power storage device 10. The temperature control conditions for example are the start control temperature Ts, the cancel-control temperature Te, the standard duty ratio in the temperature control, the control determination temperature Tj, and the control determination time Td.

In particular, for the power storage device 10 determined as the abnormal power storage device, the control unit 50 sets a lower start-control temperature Ts than for the normal power storage device 10. For the power storage device 10 determined as the abnormal power storage device, the control unit 50 sets a lower cancel-control temperature Te than for the normal power storage device 10. For the power storage device 10 determined as the abnormal power storage device, the control unit 50 sets a lower standard duty ratio than for the normal power storage device 10. For the power storage device 10 determined as the abnormal power storage device, the control unit 50 sets a lower control determination temperature Tj than for the normal power storage device 10. For the power storage device 10 determined as the abnormal power storage device, the control unit 50 sets a longer control determination time Td than for the normal power storage device 10.

(Operations of the Power Supply Device)

Figure 13:
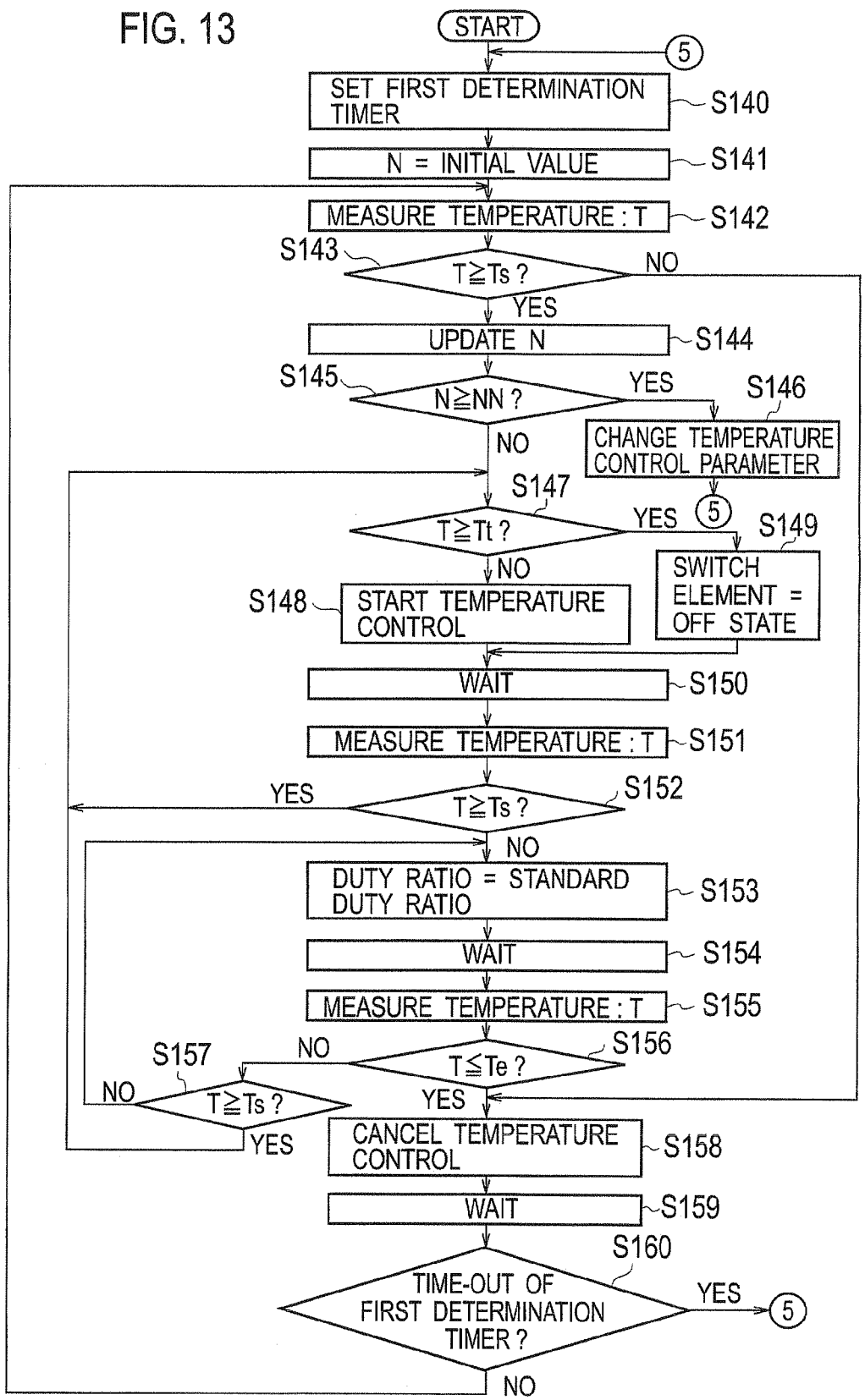
FIG. 13 is a flowchart showing operations of the control unit 50 concerning modified example 5 of the first embodiment.

Operations of the power supply device concerning the modified example 5 will be described by referring to the drawings below. FIG. 13 is a flowchart showing operations of the power supply device 100 (the control unit 50) concerning the modified example 5. While the modified example 5 will be described with respect to the above-described conditions 1, naturally the modified example 5 also is applicable to the conditions 2.

As shown in FIG. 13, at step S140, the control unit 50 sets the first determination timer. The first determination timer is a timer that times the first determination time TN1 (for example 2 hours), which may be a count up type or a count down type.

At step S141, the control unit 50 sets an initial value (for example "0") as a repeat count N.

At step S142, the control unit 50 measures the temperature T of the power storage device 10.

At step S143, the control unit 50 determines whether or not the temperature T is above or equal to the start-control temperature Ts (for example 70° C.). If the temperature T is above or equal to the start-control temperature Ts, the control unit 50 advances the process to step S144. On the other hand, if the temperature T is below the start-control temperature Ts, the control unit 50 advances the process to step S158.

At step S144, the control unit 50 updates the repeat count N. Here, the control unit 50 adds "1" to the repeat count N. At step S145, the control unit 50 determines whether or not the repeat count N is above or equal to the predetermined number of times NN (for example 3 times). If the repeat count N is above or equal to the predetermined number of times NN, the control unit 50 advances the process to step S146. On the other hand, if the repeat count N is below the predetermined number of times NN, the control unit 50 advances the process to step S147.

At step S146, the control unit 50 changes the temperature control conditions to more strict conditions. In particular, the control unit 50 changes at least one of the start control temperature Ts, the cancel-control temperature Te, and the standard duty ratio in the temperature control. For example, the control unit 50 may subtract a certain temperature width TW (for example 5° C.) from the start-control temperature Ts. The control unit 50 also may subtract the temperature width TW (for example 5° C.) from the cancel-control temperature Te. Additionally, the control unit 50 may change the standard duty ratio from 80% to 70%. Subsequently, the control unit 50 returns the process back to step S140.

At step S147, the control unit 50 determines whether or not the temperature T is above or equal to the trip temperature Tt (for example 80° C.). If the temperature T is above or equal to the trip temperature Tt, the control unit 50 advances the process to step S149. On the other hand, if the temperature T is below the trip temperature Tt, the control unit 50 advances the process to step S148.

At step S148, the control unit 50 starts the temperature control for increasing the time ratio of the OFF state in controlling the ON and OFF states of the switch element. Here, the control unit 50 sets the duty ratio as "80×{1−(T−Ts)/(Tt−Ts)}"%. In addition, "80%" is the standard duty ratio in the temperature control. Also, it should be noted that there is an instance in which the value for the standard duty ratio may be changed at the above-described step S146.

At step S149, the control unit 50 makes the state of the switch element to be the OFF state. In other words, the control unit 50 sets the duty ratio as 0%. Here, it should be noted that the control to make the switch element to be the OFF state is one embodiment of the temperature control. That is, at step S149, the control unit 50 starts the temperature control.

At step S150, the control unit 50 waits for a predetermined wait time (such as 5 seconds).

At step S151, the control unit 50 measures the temperature T of the power storage device 10.

At step S152, the control unit 50 determines whether or not the temperature T is above or equal to the start-control temperature Ts. If the temperature T is above or equal to the start-control temperature Ts, the control unit 50 returns the process back to step S147. On the other hand, if the temperature T is below the start-control temperature Ts, the control unit 50 advances the process to step S153.

At step S153, the control unit 50 sets the duty ratio to be the standard duty ratio in the temperature control (for example 80%). Also, it should be noted that there is an instance that the value for the standard duty ratio may be changed at the above-described step S146.

At step S154, the control unit 50 waits for a predetermined wait time (such as 5 seconds).

At step S155, the control unit 50 measures the temperature T of the power storage device 10.

At step S156, the control unit 50 determines whether or not the temperature T is below or equal to the cancel-control temperature Te (for example 60° C.). If the temperature T is below or equal to the cancel-control temperature Te, the control unit 50 advances the process to step S158. On the other hand, if the temperature T is above the cancel-control temperature Te, the control unit 50 advances the process to step S157.

At step S157, the control unit 50 determines whether or not the temperature T is above or equal to the start-control temperature Ts. If the temperature T is above or equal to the start-control temperature Ts, the control unit 50 returns the process back to step S147. On the other hand, if the temperature T is below the start-control temperature Ts, the control unit 50 returns the process back to step S153.

At step S158, the control unit 50 cancels the temperature control for increasing the time ratio of the OFF state in controlling the ON and OFF states of the switch element. Here, the control unit 50 sets the duty ratio as 100%.

At step S159, the control unit 50 waits for a predetermined wait time (such as 5 seconds).

At step S160, the control unit 50 determines whether or not the first determination timer has timed out. In other words, the control unit 50 determines whether or not the first determination time TN1 has elapsed. If the first determination timer has timed out, the control unit 50 returns the process to step S140. On the other hand, if the first determination time has not timed out, the control unit 50 returns the process to step S142.

(Operations and Effects)

In the modified example 5, the control unit 50 changes the temperature control conditions to more strict conditions if the number of times N that the temperature control was started within the first determination time TN1 has reached the predetermined number of times NN. Therefore, the use of the power storage device 10 determined as the abnormal power storage device is continued under more strict conditions than for the normal power storage device 10, thus improving the safety of the power supply device 100 while alleviating the load exerted to the normal power storage device 10.

Modified Example 6

A modified example 6 of the first embodiment will be described below. In the modified example 6, differences with the modified example 1 primarily will be explained. However, naturally the modified example 6 is applicable to the first embodiment also.

In the modified example 6, if the temperature control is not cancelled when a third determination time TN3 has elapsed from the start of the temperature control, the control unit 50 determines that the power storage device 10 is a abnormal power storage device. In particular, if the temperature control is not cancelled after the third determination time TN3 has elapsed from the start of the temperature control, the control unit 50 locks the switch element in the OFF state and separates the power storage device 10.

(Operations of the Power Supply Device)

Figure 14:
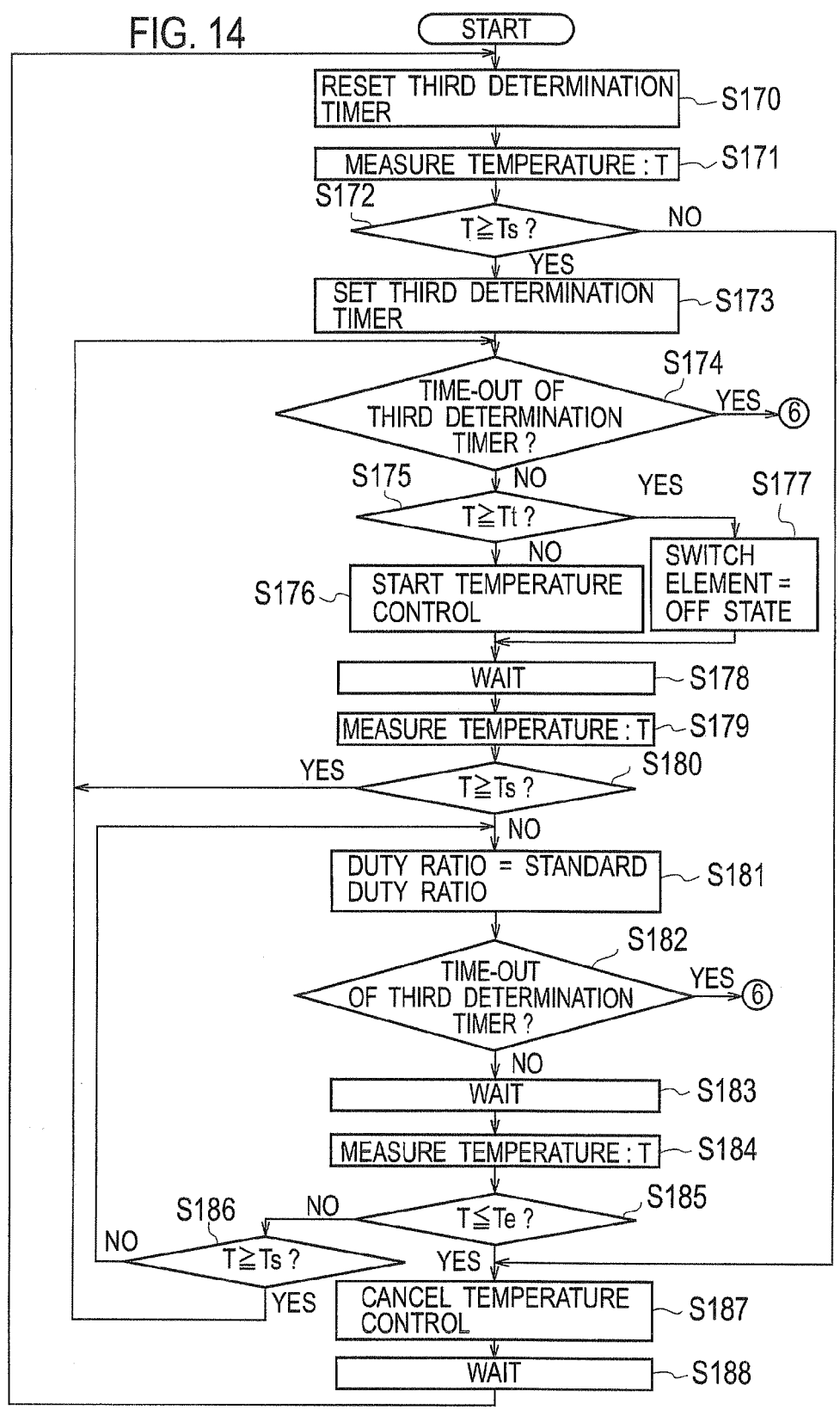
FIG. 14 is a flowchart showing operations of the control unit 50 concerning modified example 6 of the first embodiment.
Figure 15:
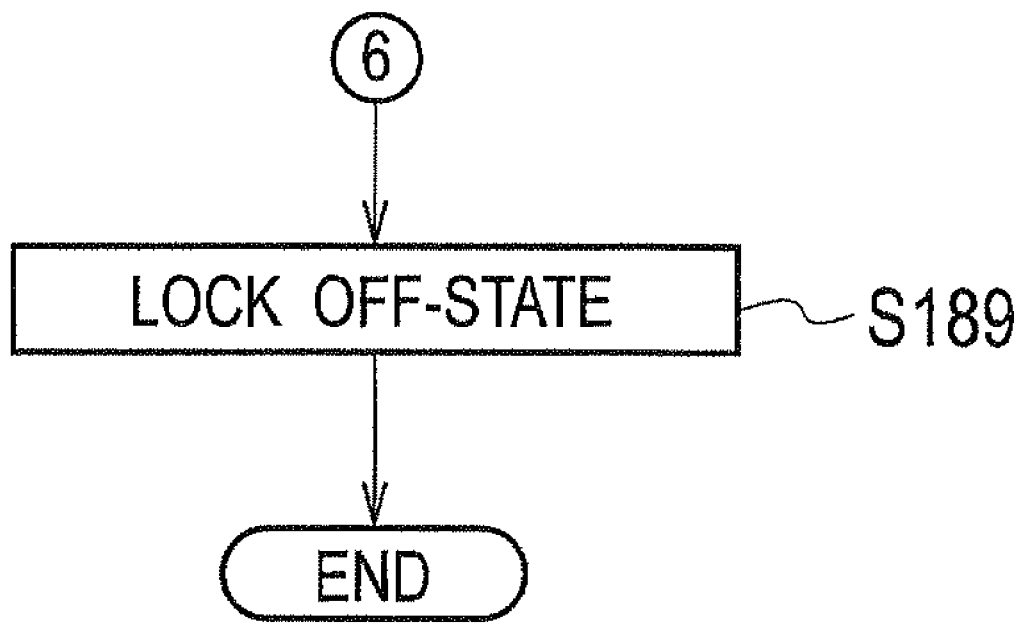
FIG. 15 is a flowchart showing operations of the control unit 50 concerning modified example 6 of the first embodiment.

Operations of the power supply device concerning the modified example 6 now will be described by referring to the drawings below. FIGS. 14-15 are flowcharts showing operations of the power supply device 100 (the control unit 50) concerning the modified example 6. While the modified example 6 will be described with respect to the above-described conditions 1, naturally the modified example 6 also is applicable to the conditions 2.

As shown in FIG. 14, at step S170, the control unit 50 resets the third determination timer. The third determination timer is a timer that times the third determination time TN3 (for example 15 minutes), which may be a count up type or a count down type.

At step S171, the control unit 50 measures the temperature T of the power storage device 10.

At step S172, the control unit 50 determines whether or not the temperature T is above or equal to the start-control temperature Ts (for example 70° C.). If the temperature T is above or equal to the start-control temperature Ts, the control unit 50 advances the process to step S173. On the other hand, if the temperature T is below the start-control temperature Ts, the control unit 50 advances the process to step S187.

At step S173, the control unit 50 sets the third determination timer.

At step S174, the control unit 50 determines whether or not the third determination timer has timed out. In other words, the control unit 50 determines whether or not the third determination time TN3 has elapsed from the start of the temperature control. If the third determination timer has timed out, the control unit 50 advances the process to step S189 (see FIG. 15). On the other hand, if the third determination time has not timed out, the control unit 50 advances the process to step S175.

At step S175, the control unit 50 determines whether or not the temperature T is above or equal to the trip temperature Tt (for example 80° C.). If the temperature T is above or equal to the trip temperature Tt, the control unit 50 advances the process to step S177. On the other hand, if the temperature T is below the trip temperature Tt, the control unit 50 advances the process to step S176.

At step S176, the control unit 50 starts the temperature control for increasing the time ratio of the OFF state in controlling the ON and OFF states of the switch element. Here, the control unit 50 sets the duty ratio as "80×{1−(T−Ts)/(Tt−Ts)}"%. In addition, "80%" is the standard duty ratio in the temperature control.

At step S177, the control unit 50 makes the state of the switch element to be the OFF state. In other words, the control unit 50 sets the duty ratio as 0%. Here, it should be noted that the control to make the switch element to be the OFF state is one embodiment of the temperature control. That is, at step S177, the control unit 50 starts the temperature control.

At step S178, the control unit 50 waits for a predetermined wait time (such as 5 seconds).

At step S179, the control unit 50 measures the temperature T of the power storage device 10.

At step S180, the control unit 50 determines whether or not the temperature T is above or equal to the start-control temperature Ts. If the temperature T is above or equal to the start-control temperature Ts, the control unit 50 returns the process back to step S174. On the other hand, if the temperature T is below the start-control temperature Ts, the control unit 50 advances the process to step S181.

At step S181, the control unit 50 sets the duty ratio to be the standard duty ratio in the temperature control (for example 80%).

At step S182, the control unit 50 determines whether or not the third determination timer has timed out. If the third determination timer has timed out, the control unit 50 advances the process to step S189 (see FIG. 15). On the other hand, if the third determination timer has not timed out, the control unit 50 advances the process to step S183.

At step S183, the control unit 50 waits for a predetermined wait time (such as 5 seconds).

At step S184, the control unit 50 measures the temperature T of the power storage device 10.

At step S185, the control unit 50 determines whether or not the temperature T is below or equal to the cancel-control temperature Te (for example 60° C.). If the temperature T is below or equal to the cancel-control temperature Te, the control unit 50 advances the process to step S187. On the other hand, if the temperature T is above the cancel-control temperature Te, the control unit 50 advances the process to step S186.

At step S186, the control unit 50 determines whether or not the temperature T is above or equal to the start-control temperature Ts. If the temperature T is above or equal to the start-control temperature Ts, the control unit 50 returns the process back to step S174. On the other hand, if the temperature T is below the start-control temperature Ts, the control unit 50 returns the process back to step S181.

At step S187, the control unit 50 cancels the temperature control for increasing the time ratio of the OFF state in controlling the ON and OFF states of the switch element. Here, the control unit 50 sets the duty ratio as 100%.

At step S188, the control unit 50 waits for a predetermined wait time (such as 5 seconds). Subsequently, the control unit 50 returns the process to step S170.

As shown in FIG. 15, at step 189, the control unit 50 locks the switch element in the OFF state and ends the sequence of the processes. In other words, the control unit 50 sets the duty ratio as 0% and does not bring back the power storage device 10.

(Operations and Effects)

In the modified example 6, when the temperature control is not cancelled after the third determination time TN3 has elapsed from the start of the temperature control, the control unit 50 locks the switch element in the OFF state and separates the power storage device 10. Thus, the power storage device 10 the temperature of which does not decrease with the temperature control is separated, thus improving the safety of the power supply device 100.

Modified Example 7

A modified example 7 of the first embodiment will be described below. In the modified example 7, differences with the modified example 6 primarily will be explained.

In the modified example 7, if the temperature control is not cancelled when the third determination time TN3 has elapsed from the start of the temperature control, the control unit 50 locks the switch element in the OFF state and separates the power storage device 10. In addition, the control unit 50 cancels the lock of the switch element in the OFF state when the second determination time TN2 has elapsed after the power storage device 10 was separated and brings back the power storage device 10.

(Operations of the Power Supply Device)

Figure 16:
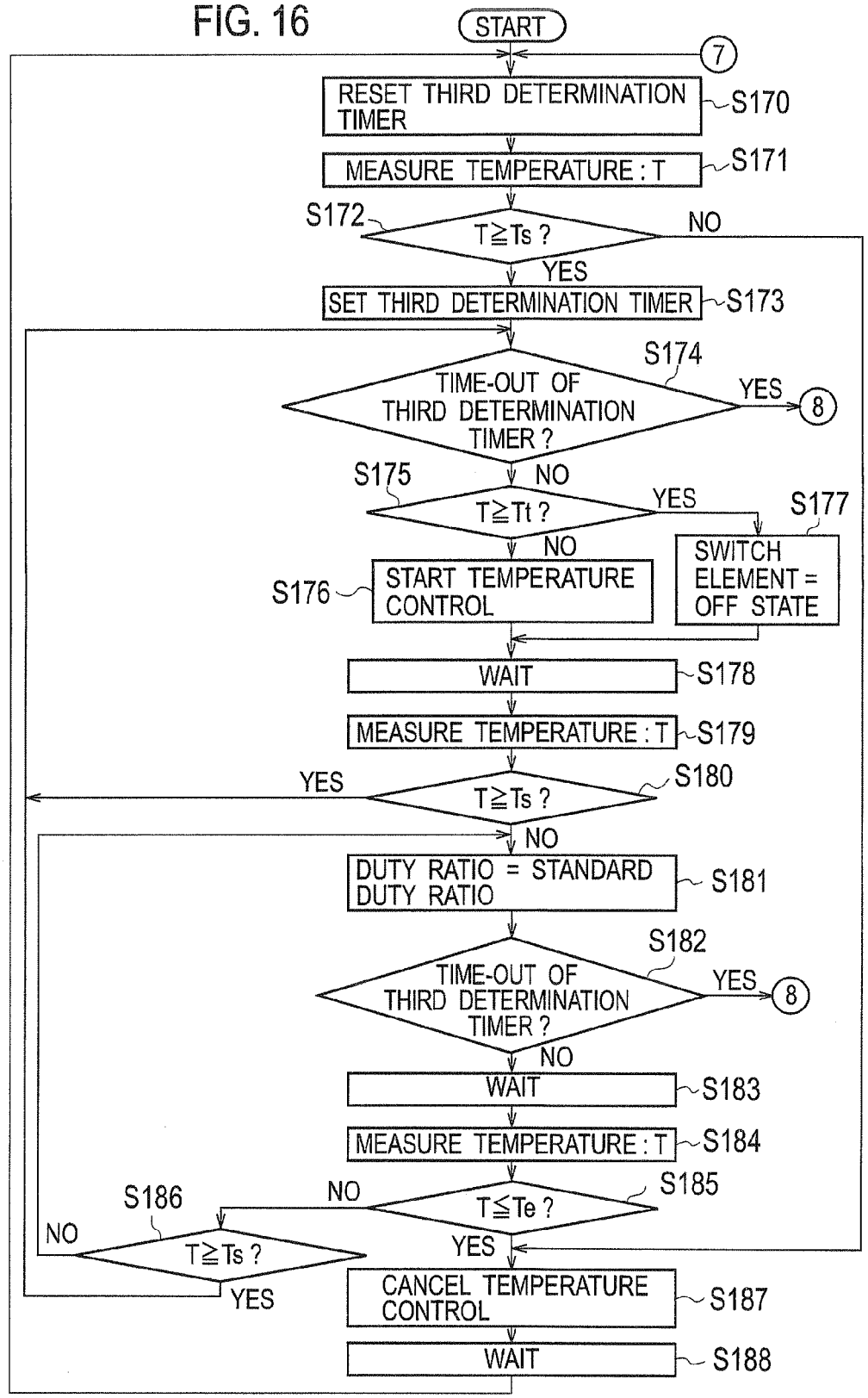
FIG. 16 is a flowchart showing operations of the control unit 50 concerning modified example 7 of the first embodiment.
Figure 17:
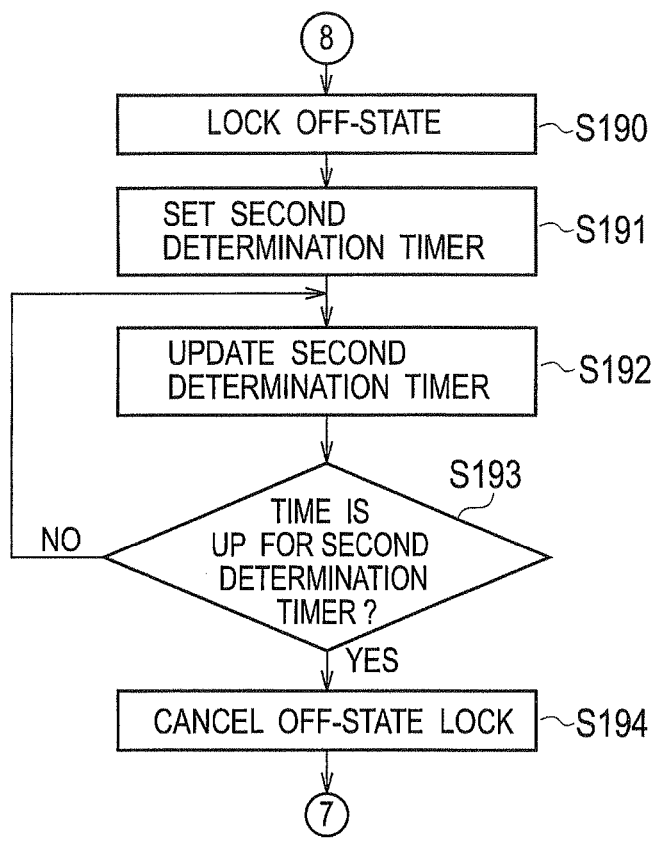
FIG. 17 is a flowchart showing operations of the control unit 50 concerning modified example 7 of the first embodiment.

Operations of the power supply device concerning the modified example 7 now will be described below by referring to the drawings. FIGS. 16-17 are flowcharts showing operations of the power supply device 100 (the control unit 50) concerning the modified example 7. While the modified example 7 will be described with respect to the above-described conditions 1, naturally the modified example 7 also is applicable to the conditions 2.

Since steps 170 to 188 as shown in FIG. 16 are the same as the processes described in the modified example 6, their explanations are omitted. The flow as shown in FIG. 17 is performed when the third determination timer is timed out.

As shown in FIG. 17, at step S190, the control unit 50 locks the switch element in the OFF state and separates the power storage device 10. In other words, the control unit 50 sets the duty ratio as 0%.

At step S191, the control unit 50 sets the second determination timer. The second determination timer is a timer that times the second determination time TN2 (for example 30 minutes), which may be a count up type or a count down type.

Preferably, the second determination time TN2 is an amount of time that is necessary for the temperature and the usage state of the power storage device 10 to be stabilized.

At step S192, the control unit 50 updates the value of the second determination timer.

At step S193, the control unit 50 determines whether or not the time is up for the second determination timer. In other words, the control unit 50 determines whether or not the second determination time TN2 has elapsed after the power storage device 10 was separated. If the time is up for the second determination timer, the control unit 50 advances the process to step S194. On the other hand, if the time is not up for the second determination timer, the control unit 50 repeats the processes of step S192 and step S193.

At step S194, the control unit 50 cancels the lock in the OFF state of the switch element, returns the process back to step S170 (see FIG. 16), and brings back the power storage device 10.

(Operations and Effects)

In the modified example 7, when the temperature control is not cancelled after the third determination time TN3 has elapsed from the start of the temperature control, the control unit 50 locks the switch element in the OFF state and separates the power storage device 10. That is, the safety of the power supply device 100 can be improved by interrupting the use of the power storage device 10 whose temperature does not sufficiently decrease within the third determination time T3.

In addition, the control device 50 cancels the lock in the OFF state of the switch element and brings back the power storage device 10 when the second determination time TN2 has elapsed after the power storage device 10 is separated.

In other words, the power storage device 10 determined as the abnormal power storage device is reused after the temperature and the usage state of the power storage device 10 has been stabilized by interrupting the use of the power storage device 10 determined as the abnormal power storage device for a while. Therefore, it becomes possible to restrain capacity decline of the power supply device 100 and to alleviate the load exerted on the normal power storage device 10 while ensuring the safety of the power supply device 100.

[Second Embodiment]

The second embodiment according to the invention now will be described below by referring to the drawings. The structure of the power supply device 100 is similar to that of the first embodiment.

In the second embodiment, the control device 50 performs the temperature control of each power storage device 10 such that the temperatures of the power storage devices 10A to 100 fall within a certain range.

(Operations of the Power Supply Device)

Figure 18:
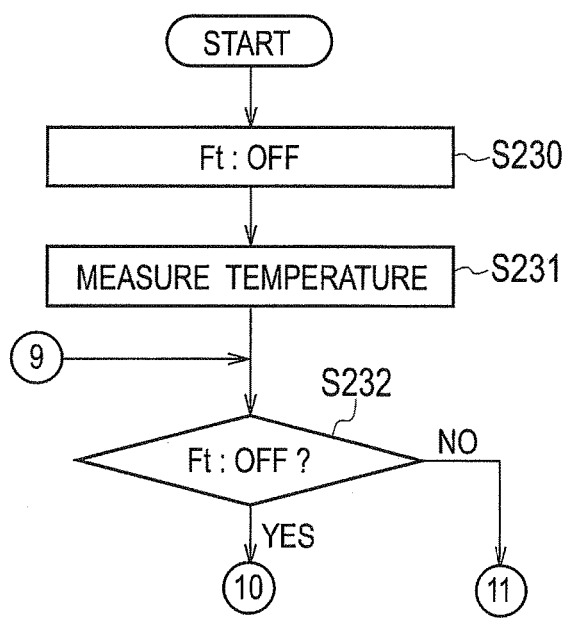
FIG. 18 is a flowchart showing operations of the control unit 50 concerning the second embodiment.
Figure 19:
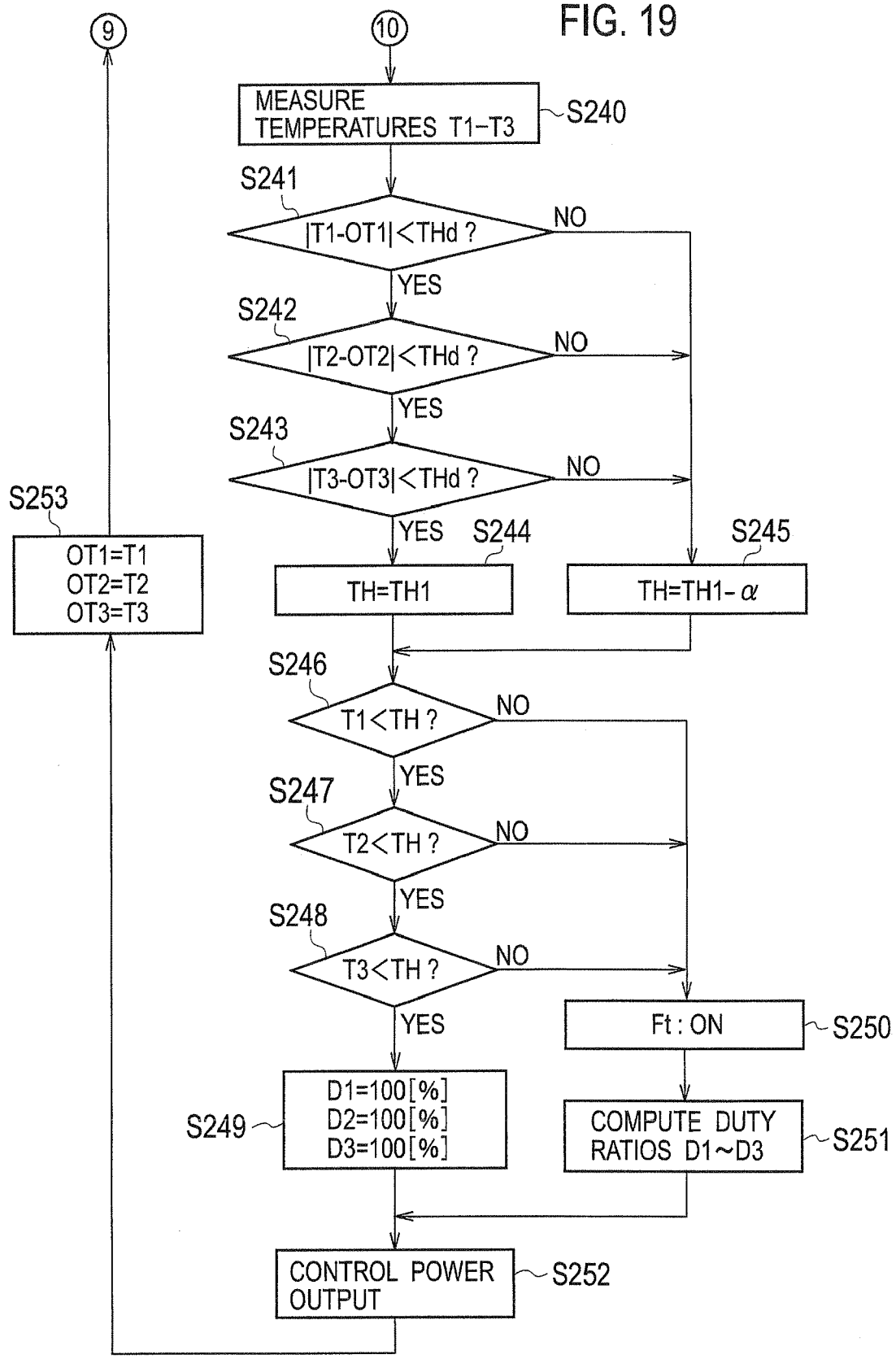
FIG. 19 is a flowchart showing operations of the control unit 50 concerning the second embodiment.
Figure 20:
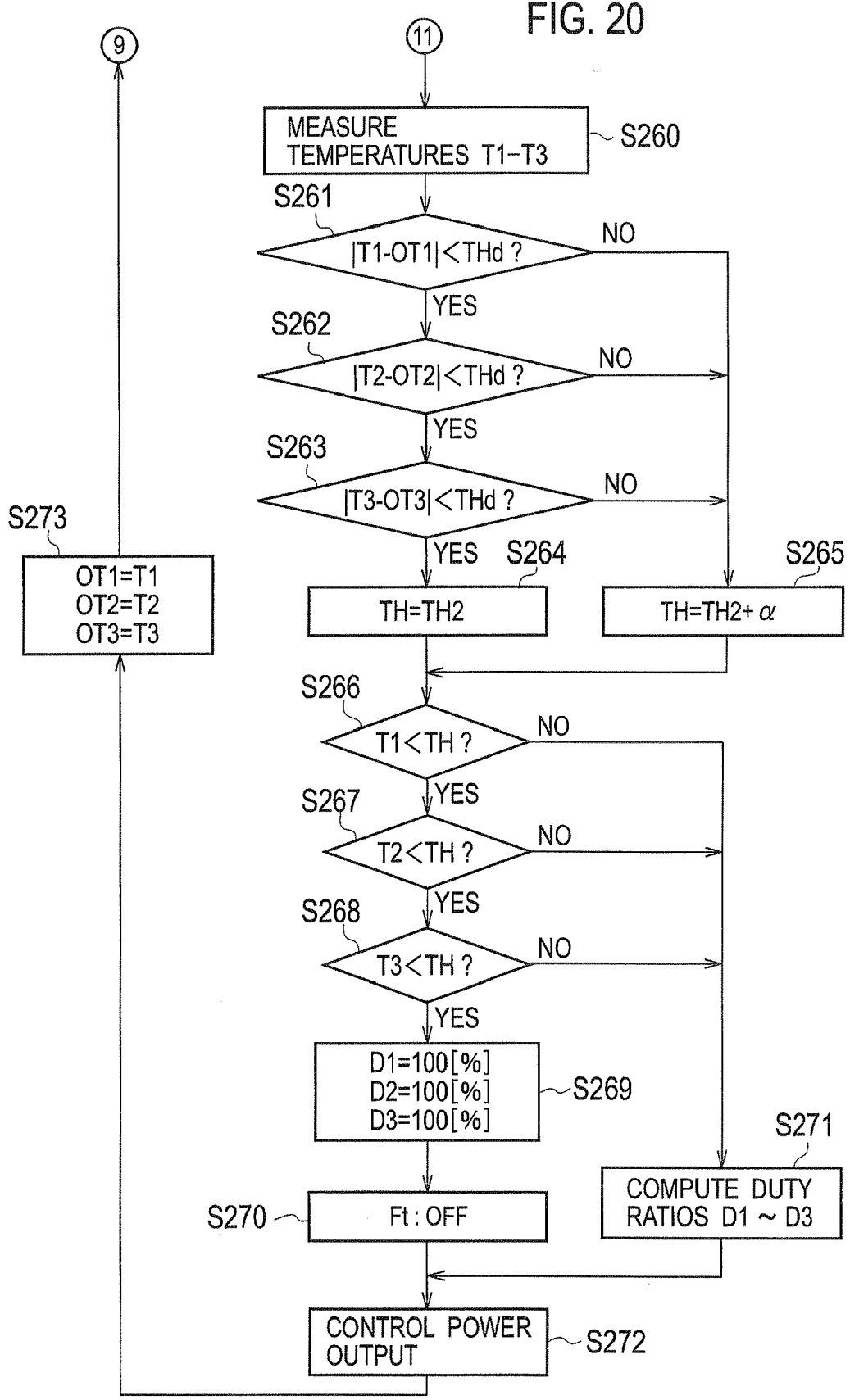
FIG. 20 is a flowchart showing operations of the control unit 50 concerning the second embodiment.

Operations of the power supply device according to the second embodiment now will be described below by referring to the drawings. FIGS. 18 to 20 are flowcharts showing operations of the power supply device 100 (control unit 50) according to the second embodiment.

The flows shown in FIGS. 18 to 20 are processes that are repeated in a predetermined cycle. The temperatures of the power storage devices 10A to 10C in the present round process are expressed as T1 to T3. Also, the temperatures of the power storage devices 10A to 10C in the previous round process are expressed as OT1 to OT3.

As shown in FIG. 18, at step S230, the control unit 50 initializes a flag Ft that shows whether or not the temperature control to decrease the duty ratio of each power storage device 10 is performed. To be more precise, the control unit 50 sets the flag Ft to be OFF.

At step S231, the control unit 50 measures the temperature of each power storage device 10. In other words, the control unit 50 measures the temperatures T1 to T3.

At step S232, the control unit 50 determines whether or not the flag Ft is set as OFF. As described below, it should be noted that the flag Ft is updated in the flow as shown in FIG. 19 or FIG. 20. If the flag Ft is set as OFF, the process advances to step S240 (see FIG. 19). On the other hand, if the flag Ft is set as ON, the process advances to step S260 (see FIG. 20).

As shown in FIG. 19, in the case that the flag Ft is OFF, at step S240, the control device 50 measures the temperature of each power storage device 10. That is, the control device 50 measures the temperatures T1 to T3.

At steps S241 to S243, the control device 50 determines whether or not the amount of temperature change (the amount of increase or the amount of decrease) of each power storage device is smaller than a threshold value THd. If the amount of temperature change is smaller than the threshold value THd for all the power storage devices 10, the control device 50 advances the process to step S244. On the other hand, if the amount of temperature change is larger than the threshold value THd for any of the power storage devices 10, the control unit 50 advances the process to step S245.

At step S244, the control unit 50 sets a start-control temperature TH1 (the above-described Ts) as the determination threshold value TH.

At step S245, the control unit 50 sets a value that a predetermined temperature a is subtracted from the start-control temperature TH1 as the determination threshold value TH.

At steps S246 to S248, the control unit 50 determines whether or not the temperature of each power storage device 10 is smaller than the determination threshold value TH. If the temperature is smaller than the determination threshold value TH for all the power storage devices 10, the control device 50 advances the process to step S249. On the other hand, if the temperature is larger than the determination threshold value TH for any of the power storage devices 10, the control unit 50 advances the process to step S250.

At step S249, the control unit 50 sets the duty ratio of each power storage device 10 as 100%.

At step S250, the control unit 50 sets the flag Ft as ON.

At step S251, the control unit 50 performs the temperature control to decrease the duty ratio with respect to at least one of the power storage devices 10. In particular, the control unit 50 sets the duty ratio of each power storage device 10 using the lowest temperature Tmin among the temperatures T1 to T3. That is, the duty ratio is obtained from Tmin/Tn. Here, Tn is a temperature of the $n^{th}$ power storage device 10.

For example, an example is considered in which T1=60° C., T2=70° C., and T3=80° C. The duty ratio of the power storage device 10A is 60/60=100%. The duty ratio of the power storage device 10B is 60/70=86%. The duty ratio of the power storage device 10C is 60/80=75%.

At step S252, the control unit 50 controls an output of each power storage device 10 according to the duty ratios set at the step S249 or the step 251.

At step S253, the control unit 50 sets T1 to be OT1. Similarly, the control unit 50 sets T2 and T3 to be OT2 and OT3.

As shown in FIG. 20, in the case in which the flag Ft is ON, at step S260, the control device 50 measures the temperature of each power storage device 10. That is, the control device 50 measures the temperatures T1 to T3.

At steps S261 to S263, the control device 50 determines whether or not the amount of temperature change (the amount of increase or the amount of decrease) of each power storage device is smaller than a threshold value THd. If the amount of temperature change is smaller than the threshold value THd for all the power storage devices 10, the control device 50 advances the process to step S264. On the other hand, if the amount of temperature change is larger than the threshold value THd for any of the power storage devices 10, the control unit 50 advances the process to step S265.

At step S264, the control unit 50 sets a cancel-control temperature TH2 (the above-described Te) as the determination threshold value TH.

At step S265, the control unit 50 sets a value that a predetermined temperature a is added to the cancel-control temperature TH2 as the determination threshold value TH.

At steps S266 to S268, the control unit 50 determines whether or not the temperature of each power storage device 10 is smaller than the determination threshold value TH. If the temperature is smaller than the determination threshold value TH for all power storage devices 10, the control device 50 advances the process to step S269. On the other hand, if the temperature is larger than the determination threshold value TH for any of the power storage devices 10, the control unit 50 advances the process to step S271.

At step S269, the control unit 50 sets the duty ratio of each power storage device 10 as 100%.

At step S270, the control unit 50 sets the flag Ft as OFF.

At step S271, the control unit 50 performs the temperature control to decrease the duty ratio with respect to at least one of the power storage devices 10. In particular, the control unit 50 sets the duty ratio of each power storage device 10 using the lowest temperature Tmin among the temperatures T1 to T3. That is, the duty ratio is obtained from Tmin/Tn. Here, Tn is a temperature of the $n^{th}$ power storage device 10.

For example, an example is considered in which T1=60° C., T2=70° C., and T3=80° C. The duty ratio of the power storage device 10A is 60/60=100%. The duty ratio of the power storage device 10B is 60/70=86%. The duty ratio of the power storage device 10C is 60/80=75%.

At step S272, the control unit 50 controls an output of each power storage device 10 according to the duty ratios set at the step S269 or the step 271.

At step S273, the control unit 50 sets T1 to be OT1. Similarly, the control unit 50 sets T2 and T3 to be OT2 and OT3.

(Operations and Effects)

In the second embodiment, the control unit 50 performs the temperature control of each power storage device 10 such that the amount of temperature change for the power storage devices 10A to 10C fall within a predetermined range. Thus, the temperatures of the power storage devices 10A to 10C fall within a predetermined range. That is, it becomes possible to restrain shortening of the life duration for the power supply device 100 as a whole by restraining the variation in the temperatures of the power storage devices 10.

Third Embodiment

Now the third embodiment will be described below. In the third embodiment, primarily the differences with the first embodiment will be described. In addition, it should be noted that the modified examples 1 to 7 and the second embodiment are applicable to the third embodiment also.

(Structure of the Power Supply Device)

Figure 21:
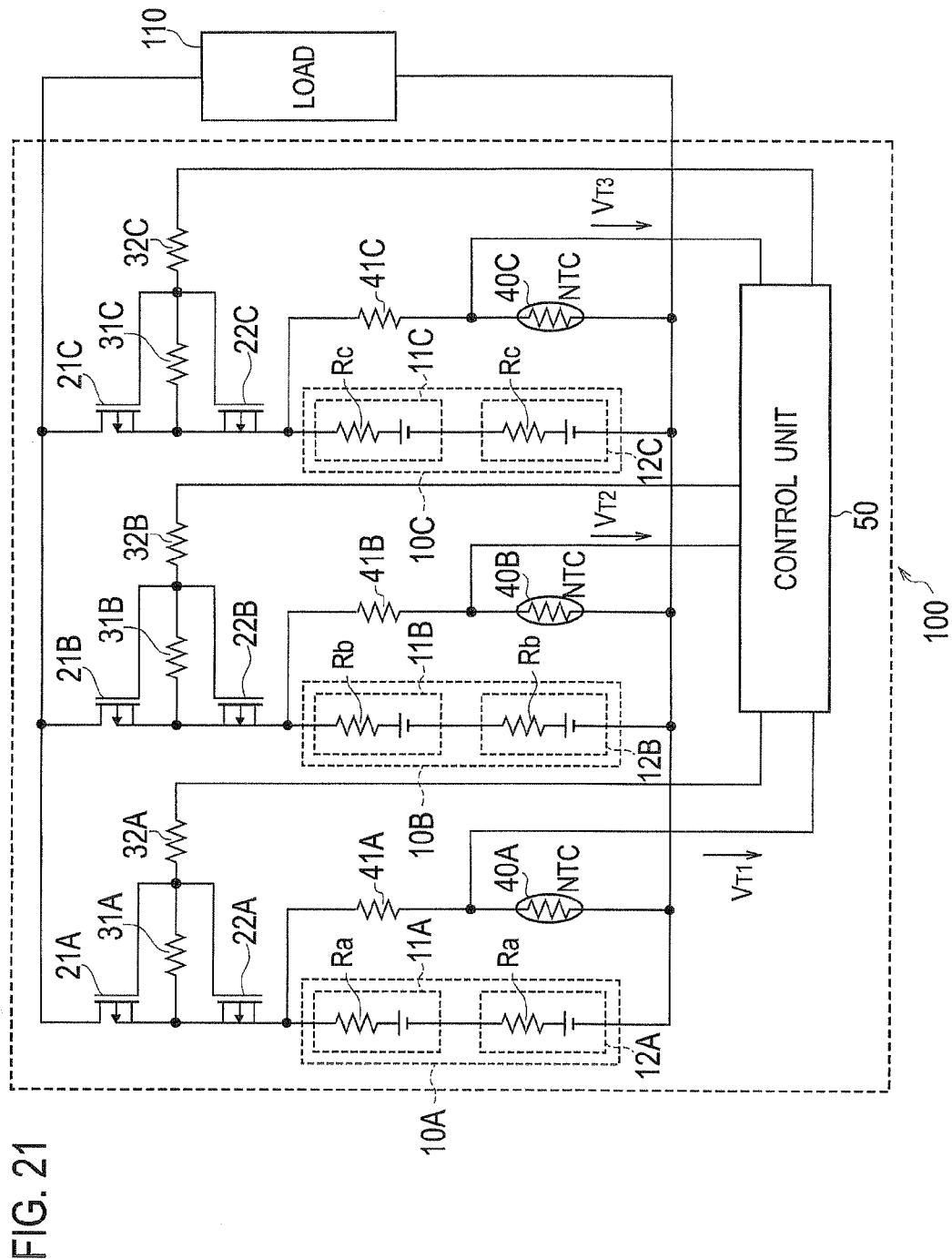
FIG. 21 is a circuit diagram showing a power supply device 100 concerning the third embodiment of the present invention.

The third embodiment of the power supply device according to the invention now will be described below by referring to the drawings. FIG. 21 is a circuit diagram showing a power supply device 100 according to the third embodiment. It should be noted that similar reference numbers are assigned to the structures that are similar to FIG. 1.

As shown in FIG. 21, each power storage device 10 has a plurality of power storage devices that are connected in series. In particular, the power storage device 10A has a power storage device 11A and a power storage device 12A connected in series. Similarly, the power storage device 10B has a power storage device 11B and a power storage device 12B connected in series, and the power storage device 100 has a power storage device 11C and a power storage device 12C connected in series.

In addition, the resistance value of an internal resistance Ra provided at the power storage device 11A may be the same as the resistance value of an internal resistance Ra provided at the power storage device 12A, or they may be different. Similarly, the resistance value of an internal resistance Pb provided at the power storage device 11B may be the same as the resistance value of an internal resistance Pb provided at the power storage device 12B, or they may be different. Also, the resistance value of an internal resistance Rc provided at the power storage device 11C may be the same as the resistance value of an internal resistance Rc provided at the power storage device 12C, or they may be different.

In addition, the number of the power storage devices connected in series in the power storage device 10 is not limited to 2 but it also may be three or more.

(Operations and Effects)

In the third embodiment, the power storage device 10 has a plurality of power storage devices that are connected in series, and therefore, high power of the power supply device 100 can be achieved.

[Fourth Embodiment]

Now the fourth embodiment of the invention will be described. In the fourth embodiment, an electric vehicle in which the above-described power supply device 100 is provided will be described.

(Structure of the Electric Vehicle)

Figure 22:
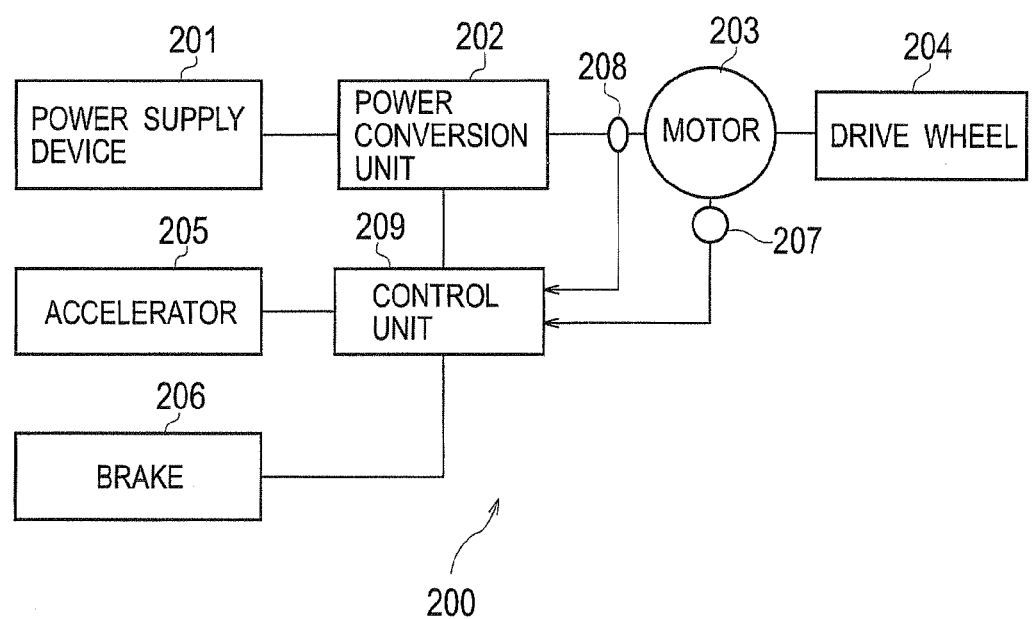
FIG. 22 is a diagram showing the structure of an electric vehicle 200 concerning the fourth embodiment of the present invention.

Now the electric vehicle according to the fourth embodiment will be described by referring to the drawings below. FIG. 22 is a view showing an electric vehicle 200 according to the fourth embodiment.

As shown in FIG. 22, the electric vehicle 200 includes a power supply device 201, a power conversion unit 202, a motor 203, a drive wheel 204, an accelerator 205, a brake 206, a rotation sensor 207, a current sensor 208, and a control unit 209.

The power supply device 201 is the power supply device 100 as described above. That is, the power supply device 201 has the power storage devices 10 that are connected in parallel.

According to an operation of the motor 203, the power conversion unit 202 converts the electric power from the power supply device 201 to electric power required by the motor 203. Also, in a case that the motor 203 performs regeneration, according to an operation of the motor 203, the power conversion unit 202 converts the electric power from the motor 203 to electric power stored in the power supply device 201.

The motor 203 generates torque by the electric power converted by the power conversion unit 202. The torque generated by the motor 203 is transmitted to the drive wheel 204.

The drive wheel 204 is a wheel connected to the motor 203 among the wheels provided in the electric vehicle 200.

The accelerator 205 is a mechanism to increase the rotation speed of the motor 203. The brake 206 is a mechanism to decrease the rotation speed of the motor 203.

The rotation sensor 207 detects the rotation speed of the motor 203. The current sensor 208 detects the current value supplied to the motor 203.

The control unit 209 computes command torque based on the information obtained from the accelerator 205 and the rotation sensor 207 etc. The control unit 209 computes a current command value based on the command torque. The control unit 209 controls the power conversion unit 202 based on the difference between the current value obtained from the current sensor 208 and the current command value. With this, the control unit 209 controls the rotation speed of the motor 203. In addition, the control unit 209 controls regeneration of the motor 203 based on the information obtained from the brake 206 etc.

[Other Embodiments]

The present invention may be embodied in other specific forms without departing from the spirit or essential characteristics thereof.

The embodiments are therefore to be considered in all respects as illustrative and not restrictive, the scope of the present invention being indicated by the appended claims rather than by the foregoing description, and all changes that come within the meaning and range of equivalency of the claims therefore are intended to be embraced therein.

While the thermistor was illustrated as the temperature detection unit in the above-described embodiments, the temperature detection unit is not limited to the thermistor.

While the FET was illustrated as the switch element in the above-described embodiments, the switch element is not limited to the FET. For example, the switch element also may be a bipolar transistor.

In the above-described embodiments, the circuit structure of the power supply device 100 was only illustrative, and the circuit structure of the power supply device 100 may be modified appropriately.

According to the present invention, it is possible to provide a power supply device and an electric vehicle that can restrain shortening of the life duration of the device as a whole by restraining increase and variation of the temperature of each power storage device.

What is claimed is:

1. A power supply device having a plurality of power storage devices connected in parallel, comprising:

temperature detection units for detecting temperatures of each of the plurality of power storage devices;

switch elements respectively connected to each of the plurality of power storage devices in series; and a control unit for controlling ON and OFF states of each of the switch elements, wherein the control unit performs a temperature control for increasing a time ratio of the OFF state in controlling the ON and OFF states of each of the switch elements based on each of the temperatures detected by the temperature detection units, and wherein the control unit starts the temperature control if a temperature detected by one of the temperature detection units exceeds a start-control temperature, and the control unit stops the temperature control when a temperature detected by the temperature detection unit falls below a cancel-control temperature which is lower than the start-control temperature, or the control unit starts the temperature control if a temperature detected by one of the temperature detection units exceeds a control determination temperature, and the control unit stops the temperature control when a time elapsed after a temperature detected by the temperature detection unit falls below the control determination temperature reaches a control determination time.

2. The power supply device of claim 1, wherein the control unit determines that a power storage device for which a repeat count in starting and stopping the temperature control has reached a predetermined number of times is an abnormal power storage device among the plurality of power storage devices.

3. The power supply device of claim 2, wherein the control unit separates the power storage device determined as the abnormal power storage device by locking the corresponding switch element in the OFF state.

4. The power supply device of claim 2, wherein the control unit changes a condition in the temperature control for the power storage device determined as the abnormal power storage device.

5. The power supply device of claim 1, wherein at least one of the plurality of power storage devices is composed of a plurality of power storage devices connected in series.

6. An electric vehicle, comprising:
a power supply device of claim 1;
an electric motor for generating power from electric power supplied by the power supply device; and
a drive wheel to which the power generated by the electric motor is transmitted.

* * * * *